United States Patent

Moritsugu et al.

[11] Patent Number: 5,631,891
[45] Date of Patent: May 20, 1997

[54] DISK REPRODUCING CIRCUIT WITH AUTOMATIC GAIN CONTROL

[75] Inventors: Masaharu Moritsugu; Shigeyoshi Tanaka, both of Kawasaki, Japan

[73] Assignee: Fujitsu Limited, Japan

[21] Appl. No.: 332,568

[22] Filed: Oct. 31, 1994

[30] Foreign Application Priority Data

Jan. 5, 1994 [JP] Japan .................................. 6-000087
Mar. 17, 1994 [JP] Japan .................................. 6-047093

[51] Int. Cl.⁶ .................................................. G11B 20/10
[52] U.S. Cl. .................................................. 369/124; 369/59
[58] Field of Search .............................. 369/54, 48, 58, 369/124, 59

[56] References Cited

U.S. PATENT DOCUMENTS 5,311,493  5/1994  Fuji .................................. 369/59
5,365,505  11/1994 Fuji .................................. 369/59

FOREIGN PATENT DOCUMENTS 648513   1/1989  Japan .
3102677  4/1991  Japan .
581676   4/1993  Japan .
5114188  5/1993  Japan .
5114189  5/1993  Japan .
5128624  5/1993  Japan .

*Primary Examiner*—Georgia Y. Epps
*Assistant Examiner*—Kim-Kwok Chu
*Attorney, Agent, or Firm*—Greer, Burns & Crain, Ltd.

[57] ABSTRACT

Disclosed is an optical disk apparatus having a zero-cross signal generating unit for differentiating a reproduced signal read from an optical disk and outputting a zero-cross signal when the differentiated signal crosses the zero level, and a gate signal generating unit for generating a gate signal using the reproduced signal, wherein a data pulse is outputted when the zero-cross signal is generated while the gate signal is being produced. A clamping circuit clamps the peak of a reproduced signal from an optical disk, an amplitude comparator compares the amplitude of a clamped signal, which is outputted by the clamping circuit, with a reference voltage, and an AGC control unit controls the gain of a variable-gain amplifier by generating a control voltage signal in dependence upon an amplitude difference. The gate signal generating unit generates the gate signal upon comparing the clamped signal outputted by the clamping circuit with a prescribed signal level. A data-pulse output unit outputs the data pulse when the zero-cross signal of the differentiated reproduced signal is generated while the gate signal is being produced.

17 Claims, 35 Drawing Sheets

DISK REPRODUCING CIRCUIT WITH AUTOMATIC GAIN CONTROL

BACKGROUND OF THE INVENTION

This invention relates to an optical disk apparatus and, more particularly, to an optical disk apparatus in which data can be read from an optical disk accurately even in a case where resolution has declined owing to an increase in density or a change in recording conditions.

Further, the present invention is related to an optical disk apparatus and, more particularly, to an optical disk apparatus in which data is recorded by the absence or presence of marks and data is demodulated from a reproduced signal obtained by reading the marks from an optical disk on which mark edges have been recorded as "1"s.

In recent years an optical disk apparatus has been developed as an external storage device for a computer and the apparatus has been put into practical use. In an optical disk apparatus, a semiconductor laser is narrowed down to a very small spot on the wavelength order and data is recorded on a medium. A major feature of such an apparatus is the possibility of high-capacity recording. In particular, it is foreseen that an optical disk apparatus for five-inch and 3.5-inch disks standardized by the ISO specifications will find wide use in applications ranging from high-performance work stations to devices on the individual user level.

The available optical disks include writable magneto-optical disks which comprise a substrate and an amorphous, magnetic thin film such as TbFeCo deposited on the substrate. Such a disk has a property in which the retentiveness necessary for magnetic reversal of the magnetic film diminishes in conformity with a rise in temperature (retentiveness is zero at the Curie point). More specifically, recording and erasure are performed by irradiating the disk with a laser beam to raise the temperature of the disk medium to the vicinity of 200° C., thereby weakening retentiveness, applying a weak magnetic field under this condition and controlling the direction of magnetization. Accordingly, as illustrated in FIG. 20A, an upwardly directed magnetic field is applied by a writing coil 6 under a condition in which the direction of magnetization of a magnetic film 5 is pointed downward. When a portion at which the direction of magnetization is desired to be changed is irradiated with a laser beam LB via an objective lens OL, as shown in FIG. 20B, the direction of magnetization of this portion reverses, i.e., is pointed upward. This makes it possible to record information. When information is read, the magnetic film 5 is irradiated with a laser beam LB having a plane of polarization along the y axis, as illustrated in FIGS. 20C, 20D. When this is done, reflected light LBO, in which the plane of polarization has been rotated by $\theta_k$ in the clockwise direction owing to the magnetic Kerr effect, is obtained in the portion where magnetization is downwardly directed. In the portion where magnetization is upwardly directed, reflected light LB1, in which the plane of polarization has been rotated by $\theta_k$ in the counter-clockwise direction owing to the magnetic Kerr effect, is obtained. Accordingly, the direction of magnetization, namely information, can be read by detecting the state of polarization of reflected light.

Such magneto-optical disks include (1) a full RAM disk the entire surface of which is writable, (2) a partial ROM disk having a writable area (a RAM area) and a read-only area (a ROM area), and (3) a full ROM disk the entire surface of which is a ROM area.

Constitution of magneto-optical disks

FIGS. 21A, 21B are diagrams for describing the constitution of, say, a 3.5-inch magneto-optical disk, in which FIG. 21A is a general plan view and FIG. 21B a partial sectional view. A magneto-optical disk 11 has tracks in the form of concentric circles or a spiral. All of the tracks are partitioned into 25 sectors. Each sector is composed of, say, 725 bytes, and is provided at its head with an address field AF (ID area). The address field AF is followed by a data field DF (MO area, which stands for "magneto-optical area"). Recorded in the address field AF are a sector mark and address information such as a track address, sector address and preamble for reproducing a synchronizing signal. Stored in the data field DF are a VFO pattern for clock extraction, a synch byte SYNC for phase synchronization, and data DATA.

As shown in FIG. 21B, the magneto-optical disk 11 is constructed by depositing a recording layer (recording film) MGF on a transparent plastic layer (substrate) PLS, and forming a protective layer PRF on the recording film MGF. An address field AF (ID area) is preformatted by pits PT formed in advance by stamping.

System configuration utilizing magneto-optical disk medium

FIG. 22 is a diagram showing the configuration of a system which utilizes a magneto-optical disk medium. The system includes the magneto-optical disk 11, a magneto-optical disk drive 21, a host system 31 (the main body of a computer), and a data input unit (control panel) 41, which has a keyboard 41a and a mouse 41b. Numeral 51 denotes a display unit such as a CRT or liquid-crystal display, and 61 represents a printer. A hard disk device and floppy disk device are provided as necessary.

FIG. 23 is a diagram showing the electrical configuration of the system, in which portions identical with those shown in FIG. 22 are designated by like reference characters. Numeral 21 denotes the magneto-optical disk drive, 22 a hard disk drive, 31 the host system, 71a~71b I/O controllers and 72 an SCSI (small computer system interface) bus. An SCSI is an interface that connects the main body of a computer with an external storage device. The specifications of an SCSI are stipulated by the American National Standard Institute (ANSI). The SCSI bus 72 is composed of a data bus, which comprises eight bits and a parity bit, and nine control busses, by way of example. Up to a maximum of eight SCSI devices (a host computer, a disk drive controller, etc.) can be connected to the SCSI bus, and each device connected has an identification number, referred to as an "ID" (identifier), of from 0 to 7. In FIG. 23, identifiers ID0–ID1 are allocated to the I/O controllers 71a, 71b, respectively, and ID7 is allocated to the host computer 31. Though one optical disk drive 21 and one hard disk drive 22 are connected to the I/O controllers 71a, 71b, more than two drives can be connected.

The host system 31 includes a central processor 31a, a memory 31b, a DMA controller 31c, a host adapter 31d and I/O controllers 71c, 71d, all of which are connected to a host bus 31e. The host system 31 uses a floppy disk drive 23, which is connected to the I/O controller 71c. The host system further includes the control panel 41, the display device 51 and the printer 61, all of which are connected to an I/O controller 71d.

The host system 31 and the I/O controllers 71a, 71b are interconnected by an SCSI interface, and the I/O controllers 71a, 71b are connected to the respective drives 21, 22 by ESDIs (enhanced small device interfaces), by way of example. In this system the magneto-optical disk drive 21 and the hard disk drive 22 are separated from the host bus 31e, the SCSI bus 72 is provided separately of the host bus, the I/O controllers 71a, 71b for the drives are connected to this SCSI bus, and the drives 21, 22 are controlled by the I/O controllers 71a, 71b, respectively, to lighten the burden upon the host bus.

Basic construction of magneto-optical head

FIG. 24 is a diagram showing the basic construction of a magneto-optical head used in the magneto-optical disk drive 21. The magneto-optical head includes a semiconductor laser $21_1$, a collimator lens $21_2$, a true-circle correcting prism $21_3$, a beam splitter $21_4$ for transmitting light from the semiconductor laser $21_1$ and reflecting light, which has been reflected by the disk (not shown), toward a signal detection side, a reflecting mirror $21_5$ for introducing light to the disk, and a two-dimensional actuator $21_6$ having an objective lens, a tracking coil and focusing coil for finely adjusting the objective lens in tracking and focusing directions, and a biasing coil for applying an external magnetic field when data is written. The head further includes a reflecting mirror $21_7$ for introducing reflected light to a data detection side, a halfwave plate $21_8$ for rotating the plane of polarization of incident light by 45° and establishing a ratio of 1:1 between the amount of light transmitted and the amount of light reflected by a polarization beam splitter, which is a subsequent stage. The head further includes a converging lens $21_9$, the aforementioned polarization beam splitter $21_{10}$, a P-wave component detector $21_{11}$, and an S-wave component detector $21_{12}$.

Fundamentals of reading MO-area information

The polarization beam splitter $21_{10}$ transmits light which is parallel to the plane of incidence (this light is the P-wave component) and reflects light which is perpendicular to the plane of incidence (this light is the S-wave component). Accordingly, the state of polarization of incident light can be detected as a change in the amount of light transmitted and a change in the amount of light reflected. More specifically, the plane of polarization of returning light is rotated by $\theta_k$ in the clockwise or counter-clockwise direction, as shown in FIG. 25A, by the magnetic Kerr effect in dependence upon the direction of magnetization (information bits "0", "1") in the reader which reads the MO area, and the plane of polarization is rotated by 45° by the halfwave plate $21_8$. Consequently, with regard to the P-wave component (transmitted light) and S-wave component (reflected light) outputted by the polarization beam splitter $21_{10}$, the P-wave component becomes larger than the S-wave component when the information is "1" and smaller than the S-wave component when the information is "0", as shown in FIG. 25B. Accordingly, the P-wave component detector $21_{11}$ outputs a signal RDS1 shown in FIG. 25C, the S-wave component detector $21_{12}$ outputs a signal RDS2 (the polarity of which is the opposite of that of signal RDS1) shown in FIG. 25C. If these signals RDS1, RDS2 are fed into a differential amplifier, a reproduced signal RDS, from which noise of the same phase has been removed, is obtained.

Magneto-optical disk drive

FIG. 26 is a diagram showing the construction of the magneto-optical disk drive 21. Numeral 21a denotes the magneto-optical head shown in FIG. 24. The head includes the semiconductor laser $21_1$, the P-wave component detector $21_{11}$, the S-wave component detector $21_{12}$ and an objective lens OL. Numeral 21b denotes a controller constituted by a microcomputer. The controller 21b performs overall control of the magneto-optical disk drive in accordance with commands from the host system 31 (see FIG. 22), e.g., positioning control of the magneto-optical head, control for reading and recording of data, etc. Numeral 21c denotes a head-access control circuit for positioning the magneto-optical head 21a at a prescribed position in accordance with an command from the controller, 21d a data recording circuit for recording data on the magneto-optical disk, and 21e a data reproducing circuit for reproducing data that has been recorded on the magneto-optical disk.

Upon receiving a data-read command from the host (the main unit 31 of the system), the controller 21b performs in such a manner that the magneto-optical head 21a is positioned at the commanded address by the head-access control circuit 21c and made to read the recorded signal. The magneto-optical head 21a inputs the read signal to the data reproducing circuit 21e. The latter reproduces data from the signals which enter from the detectors and inputs the reproduced data to the controller 21b. The latter inputs this data to the host.

Upon receiving a data-write command from the host, the controller 21b performs in such a manner that the magneto-optical head 21a is positioned at the commanded address by the head-access control circuit 21c and the semiconductor laser $21_1$ is turned on and off based on the write data to write the data on the magneto-optical disk. In the case of the 5-inch or 3.5-inch recording format standardized in accordance with the ISO, the recorded data is encoded by RLL (2,7) encoding and the encoded data is written in the MO area. According to RLL (2,7) encoding, the number of "0"s between "1" bits after encoding varies from two to seven. The input data and encoded data are related as shown below. It should be noted that RLL is the abbreviation of "run-length limited".

| Input Data | Encoded Data |
| --- | --- |
| 10 | 0100 |
| 010 | 100100 |
| 0010 | 00100100 |
| 11 | 1000 |
| 011 | 101000 |
| 0011 | 00001000 |
| 000 | 000100 |

Encoding methods include RLL (1,7) encoding in addition to the aforementioned RLL (2,7) encoding. According to RLL (1,7) encoding, the number of "0"s between "1" bits after encoding varies from one to seven.

Data reproducing circuit

FIG. 27 is a diagram for describing a data reproduction method. Data to be recorded is encoded to data having a format (the aforementioned RLL 2,7 code) suited to the recording characteristics of the optical disk. In actual recording, recorded pits (the black circles in FIG. 27) are made to correspond to the "1" bits of the encoded data. The size of a recorded pit is on the order of the wavelength of the semiconductor laser. In the case of a presently available 3.5-inch medium according to ISO specifications, the bit-cell spacing of encoded data is smallest at the inner circumference, or about 0.75 μm.

The reproduction of data is performed by detecting a change in amount of light when a recorded pit is scanned by the semiconductor laser. The actual waveform of the reproduced signal RDS possesses peaks at the points in time at which the marks (recording pits) are present. Accordingly, reproduction of data can be performed by detecting the peak points of the reproduced signal RDS. Specifically, a gate signal GTS is created by differentiating the reproduced signal and detecting the fact that the level of the differentiated signal (DFS) is greater than a certain value. Further, the differentiated signal DFS is binarized at a zero level to create a zero-cross signal ZCS which crosses zero level at the peak points of the reproduced signal RDS. When the gate signal GTS is at the high level and the zero-cross signal ZCS decays, a reproduced-data signal DT having a prescribed duration is outputted.

FIG. 28 is a diagram showing the construction of the data reproducing circuit 21e. The circuit includes an amplifier 21e-1 for amplifying the reproduced signal RDS, a low-pass filter 21e-2, a differentiating circuit 21e-3 for differentiating the reproduced signal, a comparator 21e-4, to which the differentiated signal DFS is applied, for comparing this signal with a set value, thereby outputting the gate signal GTS, a comparator 21e-5 for binarizing the differentiated signal DFS at the zero level and outputting the zero-cross signal ZCS, a flip-flop 21e-6 for outputting the reproduced-data signal when the gate signal GTS is at the high level and the zero-cross signal ZCS decays, a delay unit 21e-7 for setting a prescribed duration W, a PLL circuit 21e-8 for extracting a clock contained in the reproduced data, and a data separator 21e-9 for outputting data in synchronism with the extracted clock.

The PLL circuit 21e-8 includes a phase comparator PHS for outputting a phase-difference signal indicating the phase difference between the reproduced data DT and the output of VFO, a charge pump CPMP for outputting a voltage which conforms to the phase difference, a low-pass loop filter LPFL, and a voltage frequency oscillator VFO for outputting a signal whose frequency conforms to the output voltage of the filter LPFL.

The reproduced data DT has a frequency which differs from that at the time of recording owing to fluctuation in the rotation of the spindle motor which rotates the disk and the disks eccentricities. The latter relates to the fact that the center of the disk shifts from the center of rotation. Because of the difference in frequency, the clock synchronized to the reproduced data is extracted from this data by the PLL circuit 21e-8. The "1", "0" data is discriminated by the data separator 21e-9 on the basis of the extracted clock.

In the conventional method of reproduction, resolution (which corresponds to V2/V1 in FIG. 27) declines and the gate signal can no longer be produced owing to a fluctuation in the sensitivity of the medium or in the recording power or as the result of an increase in density. For example, in the case of a 3.5-inch, 128-megabyte optical disk, minimum bit spacing is 1.5 µm and V2/V1 is 50~60%. When V2/V1 is on the order of 50~60%, approximately the same differentiated-signal amplitude can be obtained irrespective of whether the peaks of the reproduced signal RDS are isolated or clustered together. However, if the storage capacity is 230 megabytes according to next-generation ISO standards, recording density increases on the order of 20%. As a consequence, the reproduced signal RDS becomes as shown in (a) of FIG. 29, where it is seen that resolution V2/V1 diminishes. As a result, the differentiated signal DFS becomes as shown in (b) of FIG. 29. Even if the gate signal GTS is generated by slicing the differentiated signal DFS at a prescribed level $V_s$, the gate signal GTS will not be accurate at portions where the peaks are close together. Undetected peak portions are produced and a data reading error occurs [see (c) in FIG. 29].

Accordingly, consideration has been given to providing an equalizing circuit in back of the low-pass filter 21e-2 and emphasizing high-frequency components by means of this circuit to enlarge the amplitude V2 of the reproduced signal at a peak cluster, thereby increasing resolution. When high-frequency components are emphasized by the equalizing circuit, however, the reproduced signal RDS develops an undershoot US, as shown in FIG. 30(a), at a portion of low density. This means that when the reproduced signal is differentiated, the portion corresponding to overshoot exceeds the slice level $V_s$, as illustrated in (b) of FIG. 30, and an erroneous gate pulse GTS is generated. The problem that arises as a result is the generation of an erroneous reproduced-data pulse. Further, in the method of raising resolution by waveform equalization, high-frequency noise is emphasized at the same time and hence there is a decline in S/N ratio, which is a measure of signal quality. Another problem is that the zero-cross signal occurs at the wrong point.

What is meaningful in the reproduced signal RDS is peak point. According, it will suffice to detect the peak level of the reproduced signal by suitable means and obtain a slice level VS for creating a gate signal GTS using the peak level as a reference. However, owing to a transient at the beginning of a sector, which is the data management area of an optical disk, as well as a variation in the envelope of the reproduced signal which accompanies a fluctuation in reflection by the medium, a mechanism for detecting the peak envelope is required. FIG. 31 illustrates the manner in which transience occurs. The transient occurs due to the fact that the reproduction system is AC-coupled and DC components are lost. The band of this AC coupling is set to be sufficiently low (1/100~1/50 of signal frequency) in order to prevent the reproduced signal RDS from becoming distorted. At a fixed slice level, therefore, data over a considerable area is lost from the moment the data starts.

FIG. 32 shows one example for deciding slice level using a peak hold circuit. Numeral 81 denotes a peak hold circuit comprising a diode and a capacitor, and numeral 82 designates a slice-level deciding circuit. The capacitor C accumulates the peak values of the reproduced signal RDS. More specifically, when the reproduced signal RDS exceeds the terminal voltage of the capacitor, the diode turns on and the capacitor is charged. When the reproduced signal RDS falls below the peak value, the diode is cut off and the accumulates electric charge is discharged via the resistor R (time constant $\tau=CR$). As a result, the terminal voltage of the capacitor C varies while following up the peak value and enters the slice-level deciding circuit 82 via a buffer amplifier BA. The slice-level deciding circuit 82 decides the slice level VS, which produces the gate signal, on the basis of the peak value of the reproduced signal RDS. In order for the peak value of the reproduced signal RDS to be held accurately by the peak hold circuit 81, a high-speed buffer amplifier is required. More specifically, a follow-up characteristic on the order of nanoseconds is needed. Another problem is the precision of the buffer amplifier, which is required in order to reduce leakage from the capacitor C holding the peak value. Furthermore, a function for canceling out a decline in the forward voltage of the diode is necessary. Thus, employing the peak hold circuit involves many shortcomings in actual application.

Accordingly, there is demand for an optical-disk reproduction apparatus in which even if there is a decline in resolution owing to an increase in density or a change in recording conditions, data can be read from the optical disk accurately and the adverse effects caused by the transient at the start of data and by wave form fluctuation, which effects are ascribable to the AC coupling of the reproduction system, can be prevented.

FIG. 33 is a block diagram illustrating an information reproducing apparatus proposed in Japanese Patent Application Laid-Open (KOKAI) No. 3-102677, and FIG. 34 is a waveform diagram showing various waveforms useful in describing the operation of this apparatus. The apparatus includes an amplifier 91 for the reproduced signal RDS, a low-pass filter 92, a differentiating zero-cross detecting circuit 93 for differentiating the reproduced signal RDS and generating a zero-cross signal ZCS when the differentiated signal DS crosses the zero level, a clamping circuit 94 for clamping the lower-limit level of the reproduced signal RDS, a gate signal generating circuit 95 for outputting, as the gate signal GTS, a binarized signal obtained by slicing the output signal Vout of the clamping circuit 94 at a prescribed level $L_s$, and a reproduced digital-signal generating unit 96 for generating a reproduced digital signal DT which reverses when the zero-cross signal ZCS decays while the gate signal GTS is at the high level and reverses again when the gate signal GTS assumes the low level after generation of the zero-cross signal.

The clamping circuit 94 includes an npn transistor 94a having a base terminal to which a clamp control voltage Vset is supplied and an emitter terminal whose output is the output of the clamping circuit, a resistor 94b connected across the emitter and ground, and a capacitor 94c for cutting DC components. If an input signal Vin is greater than Vcc, the transistor 94a turns off and the input signal Vin is outputted as vout. If the input signal Vin is less than Vcc, on the other hand, the transistor 94a turns on and the biasing voltage Vcc is outputted. Thus, the clamping circuit 94 outputs a signal whose lower-limit level is clamped to Vcc.

In accordance with this clamping circuit, the lower-limit level of the reproduced signal RDS corresponding to modulation data "0" (no mark) can be clamped at a fixed voltage, as shown at (e) in FIG. 34. That is, even if the resolution of the reproduced signal RDS is low, the resolution can be increased equivalently by passing the signal through the clamping circuit 94 and it is possible to create the gate signal GTS in such a manner that the gate signal reliably attains the high level in a range which includes the peak points of the reproduced signal (the zero-cross points of the differentiated signal). Data can thus be reproduced correctly in the unit 96 which generates the reproduced digital signal.

A draw back of transistor clamping (inclusive of diode clamping), is that the time for the transistor to make the transition from on to off is long owing to the effects of the electric charge accumulated at the base. As a consequence, a time shift of from several nanoseconds to several microseconds develops between the reproduced signal RDS and the clamped output signal Vout, and a time shift Td develops in the gate signal GTS as well. The time shift developed by the gate signal GTS causes problems when density is increased (when data is transferred at high speed). Further, the proposed clamping circuit clamps the lower-limit level. Therefore, when the reproduced signal RDS picks up noise NS caused by defects in the disk, the peak value of the noise exceeds the slice level $L_s$ and erroneous reading results, as illustrated in FIG. 36.

Further, the prior art employs a recording method in which the center of a mark is adopted as "1". The reason for this is that if the reproduced signal RDS is differentiated and zero-cross detected, in the manner set forth above, then the position (timing) of a "1" can be clearly discriminated. However, the demand for greater capacity never ceases and a higher recording density is always being sought. Accordingly, a method has been proposed in which both edges of a mark are recorded as "1"s. According to this method, as depicted in FIG. 37, the recording of marks is started at odd-numbered "1"s and marks are ended at even-numbered "1"s, as a result of which recording frequency declines. This means that recording can be performed at a density twice that achieved with the recording method that adopts the center of a mark as "1". It should be noted that FIG. 37 illustrates the reproduced signal RDS in a case where a laser beam has been narrowed down by an objective lens OL and "1" data has been read at mark edges by means of the laser beam.

However, a precise proposal has not been made with regard to reproducing means for reproducing data accurately from an optical disk on which mark edges have been recorded as "1"s.

Accordingly, there is demand for an apparatus capable of accurately reproducing data recorded by such a recording method. Fundamentally, it will suffice to adopt a level intermediate the peak and bottom of the reproduced signal as the slice level, slice the reproduced signal at this slice level and discriminate marks from spaces. In actuality, however, the following problem arises:

The light signal to be detected is extremely weak and AC coupling is necessary in order to amplify this signal to a practical amplitude (on the order of one volt). When a reproduction system is AC coupled and DC components are lost, the transient occurs (see FIG. 31), as mentioned earlier. Consequently, with the method of slicing the reproduced signal at the intermediate level Vs of the peak Vp and bottom Vb of the reproduced signal RDS in the steady state an then discriminating between marks and spaces, data over a considerable area is lost from the moment the data starts. In addition, depending upon the pattern of the code data, the peak level or bottom level fluctuates and, hence, so does the intermediate level. For example, the intermediate level is high at portions where "1"s and "0"s alternate at high frequency and is low at portions where "1"s and "0"s alternate at low frequency. In such case the data cannot be reproduced accurately. Though consideration has been given to performing differentiation twice so that there will be no influence from AC coupling, the noise component is enlarged and it is difficult to distinguish data only.

SUMMARY OF THE INVENTION

Accordingly, a first object of the present invention is to provide an optical disk apparatus in which even if the amplitude of a reproduced signal fluctuates owing to a change in the environment (a change in the environmental temperature), the margin of the apparatus can be enlarged by automatically setting clamped signal amplitude to an optimum value by an AGC operation.

A second object of the invention is to provide an optical disk apparatus capable of dealing with the high-speed transfer of data by clamping the peak value of the reproduced signal at high speed by a clamping circuit using a Schottky barrier diode, which apparatus is not susceptible to defects (the effect thereof) in the optical disk.

A third object of the invention is to provide an optical disk apparatus in which even if the characteristic of a Schottky diode (the forward-voltage drop), which corresponds to the slice level, fluctuates owing to environmental temperature or junction-surface temperature, the signal amplitude after clamping can be optimized by AGC to enlarge the margin of the apparatus.

A fourth object of the invention is to provide an optical disk apparatus in which data can be demodulated accurately even if there is a change in the peak or bottom of the reproduced signal.

In accordance with the present invention, the first through third objects are attained by providing an optical disk apparatus having a zero-cross signal generating unit for differentiating a reproduced signal read from an optical disk and outputting a zero-cross signal when the differentiated signal crosses the zero level, and a gate signal generating unit for generating a gate signal using the reproduced signal, wherein a data pulse is outputted when the zero-cross signal is generated while the gate signal is being generated, the apparatus comprising a variable-gain amplifier for amplifying the reproduced signal, a clamping circuit (e.g., a diode clamping circuit using a Schottky diode) for clamping a peak value of an output signal from the amplifier, a reference voltage generator for generating a reference-voltage level, an amplitude comparator for comparing amplitude of the clamped signal outputted by the clamping circuit with the reference-voltage level, and an AGC control unit for controlling gain of the variable-gain amplifier based upon results of comparison and controlling amplitude of the output signal from the clamping circuit, wherein the gate signal generating unit generates the gate signal upon comparing the clamped signal outputted by the clamping circuit with a prescribed signal level.

According to the present invention, the fourth object is attained by providing an optical disk apparatus for reproducing data from an optical disk by detecting mark edges, comprising a clamping circuit for clamping the difference between a peak level and bottom level of a reproduced signal to a predetermined value, a comparator circuit for discriminating a mark using center level of amplitude of the clamped signal as a reference, and a demodulator for demodulating data based upon a pulse signal conforming to a mark outputted by the comparator circuit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

DESCRIPTION OF THE PREFERRED EMBODIMENTS (A) Overview of first embodiment of the invention FIG. 1 is a block diagram for describing the general features of a first embodiment of the present invention. The apparatus includes a variable-gain amplifier (AGC) 101 for amplifying a reproduced signal RDS that has been read from an optical disk, an AGC control unit 102, a clamping circuit 104 for clamping the peak value of an output signal from the amplifier 101, a gate signal generating circuit 105 for generating a gate signal GTS upon comparing a clamped voltage outputted by the clamping circuit 104 and a prescribed signal level, a zero-cross signal generating unit 106 for differentiating the reproduced signal and outputting a zero-cross signal ZCS when the differentiated signal crosses the zero level, a data-pulse output unit 107, and an amplitude comparator 108 for detecting the difference between the signal amplitude outputted by the clamping circuit 104 and a reference voltage level.

Figure 1:
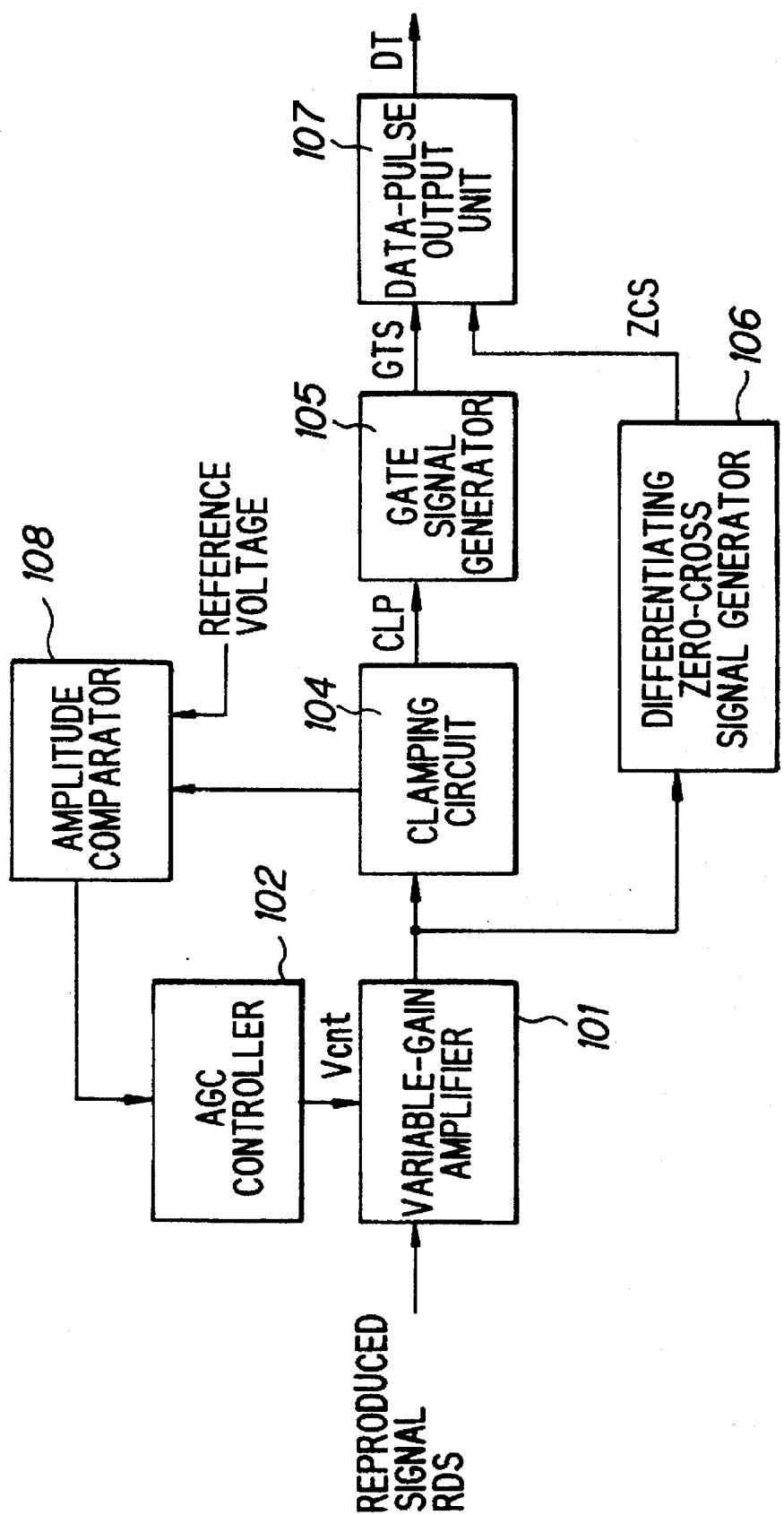
FIG. 1 is a block diagram for describing the general features of a first embodiment of the present invention.

The clamping circuit 104 clamps the peak of the reproduced signal RDS at a prescribed potential. The amplitude comparator 108 compares the clamped signal amplitude outputted by the clamping circuit 104 and the reference voltage level and outputs the difference in amplitude. On the basis of the amplitude difference, the AGC control unit 102 generates a control-voltage signal Vcnt for controlling the gain of the variable-gain amplifier 101. On the basis of the control voltage signal Vcnt, the variable-gain amplifier 101 controls gain so that the clamped signal amplitude is rendered constant. The gate signal generator 105 generates the gate signal GTS upon comparing a clamped signal CLP outputted by the clamping circuit 104 and a prescribed signal level, and the data-pulse generator 107 outputs a data pulse when the zero-cross signal ZCS is generated while the gate signal GTS is being produced.

Thus, the clamping circuit 104 clamps the peak of the reproduced signal RDS at a prescribed potential, thereby clamping the peak value at the prescribed level at all times even if the peak value of the reproduced signal fluctuates. The gate signal generator 105 is capable of generating the gate signal GTS on the basis of this constant peak value. As a result, even if the peak value of the reproduced signal RDS fluctuates, the gate signal can be generated accurately. Data can be read accurately even if there is a decline in resolution owing to an increase in density or a change in recording conditions, or even if there is a transient or a variation in envelope. Furthermore, since peak value is clamped at a fixed potential, slice level for producing the gate signal can be set high and noise generated by defects or the like will not be read erroneously. This makes it possible to eliminate the influence of such defects.

Further, the clamping circuit 104 is constructed using a Schottky diode, and the reference voltage level of the amplitude comparator 108 is made 1.1~1.7 times that of the forward voltage of the Schottky diode. If this arrangement is adopted, the margin of the apparatus can be enlarged by automatically setting the amplitude of the clamped signal to an optimum value by an AGC operation even if the amplitude of the reproduced signal fluctuates owing to the medium characteristics or a variance between drives. Further, even if the diode characteristic (forward-voltage drop) fluctuates owing to environmental temperature or junction-surface temperature, the amplitude of the clamped signal can be optimized by AGC to enlarge the margin of the apparatus.

(B) First embodiment of the invention (a) Overall configuration

Figure 2:
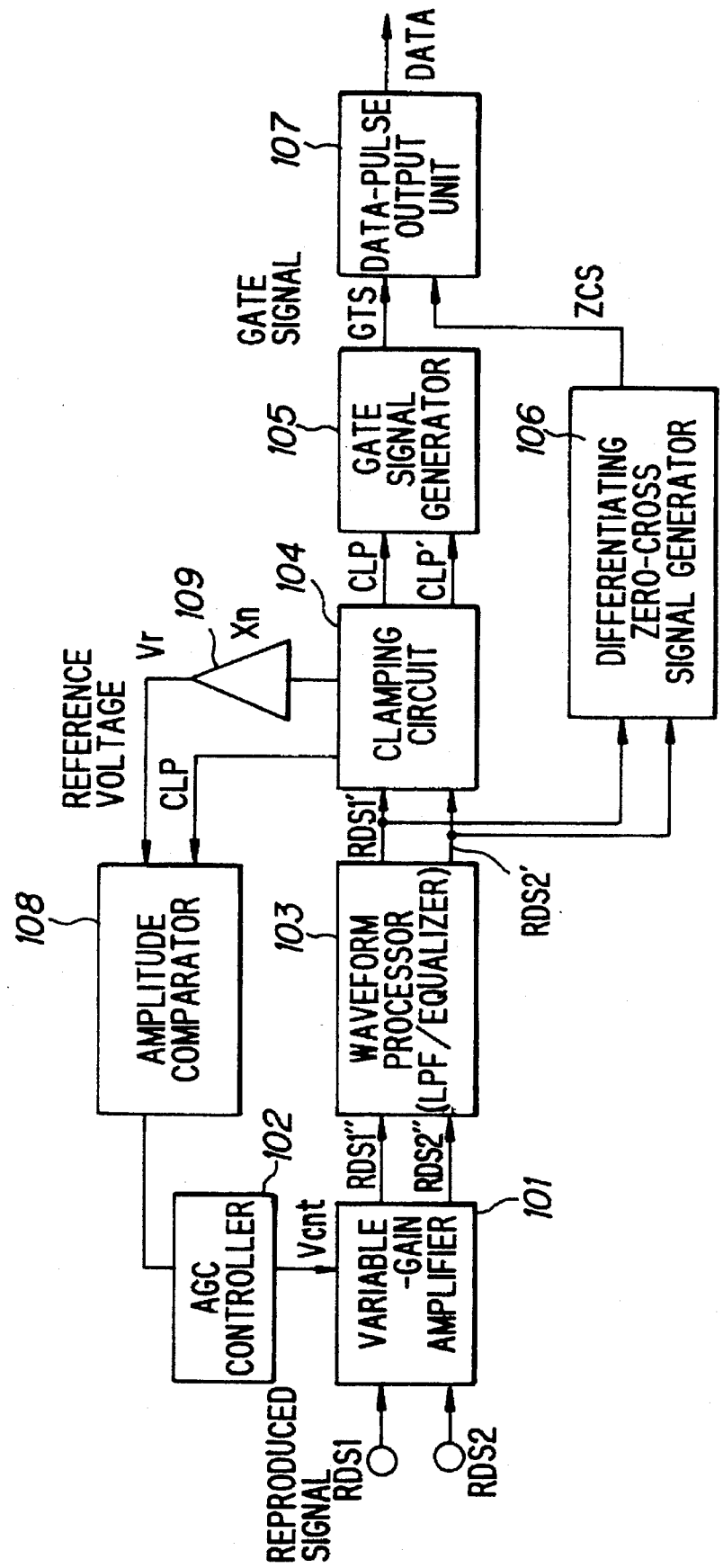
FIG. 2 is a block diagram showing the construction of an embodiment of a data reproducing circuit according to the present invention.

FIG. 2 is a block diagram showing the construction of an embodiment of a data reproducing circuit according to the present invention in an optical disk drive.

Figure 24:
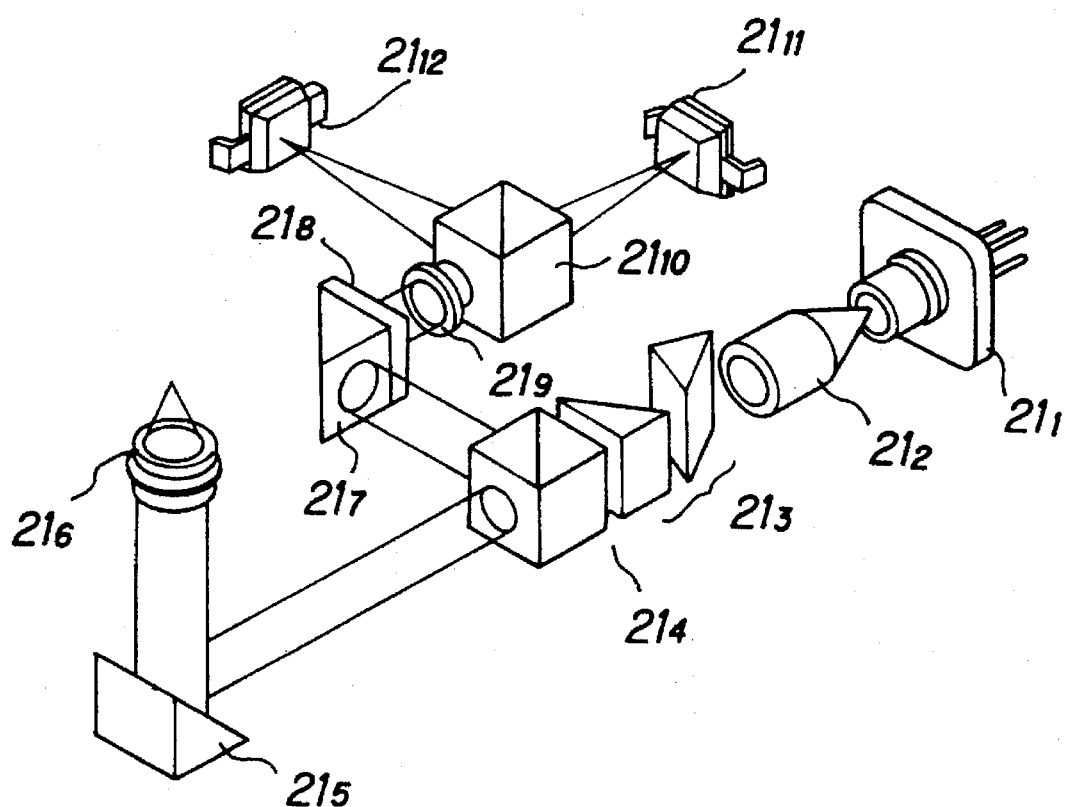
FIG. 24 is a diagram showing the basic construction of a magneto-optical head according to the prior art.
Figure 25A:
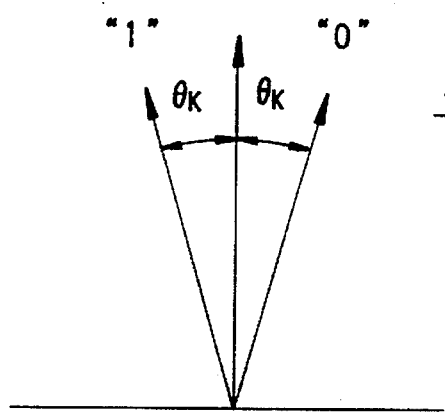
FIG. 25A–FIG. 25C are diagrams for describing the fundamentals of reading information in an MO area according to the prior art.
Figure 25B:
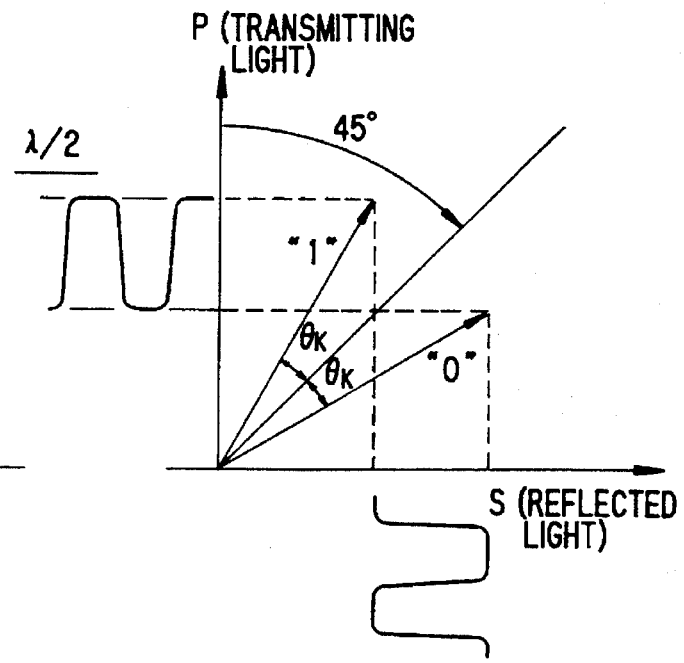
Figure 25C:
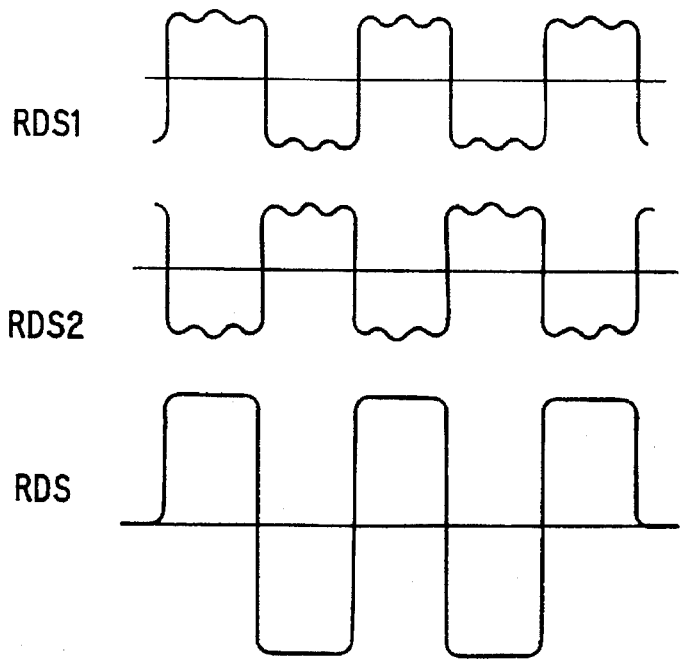
Figure 26:
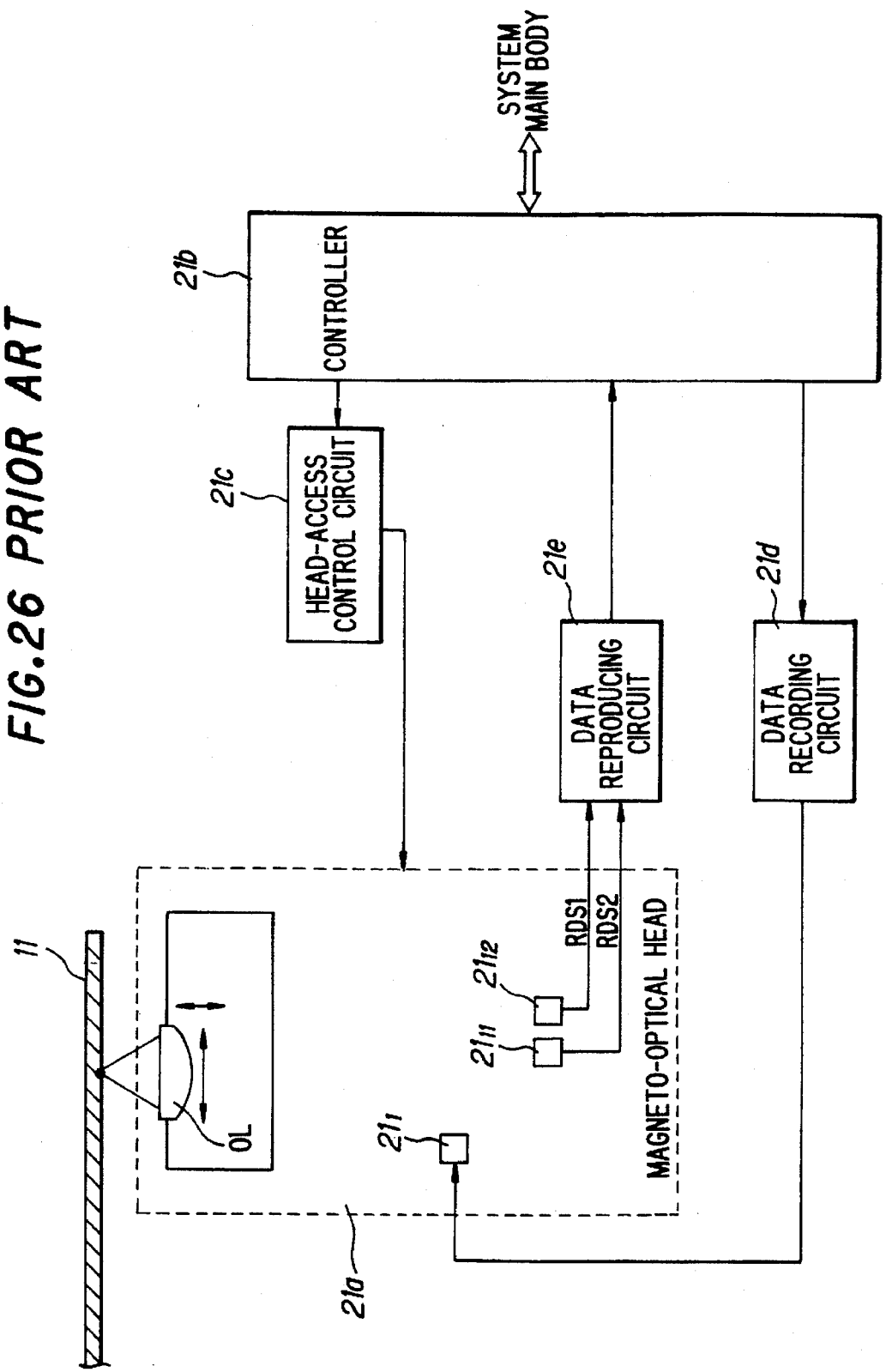
FIG. 26 is a diagram showing the construction of a magneto-optical disk drive according to the prior art.
Figure 27:
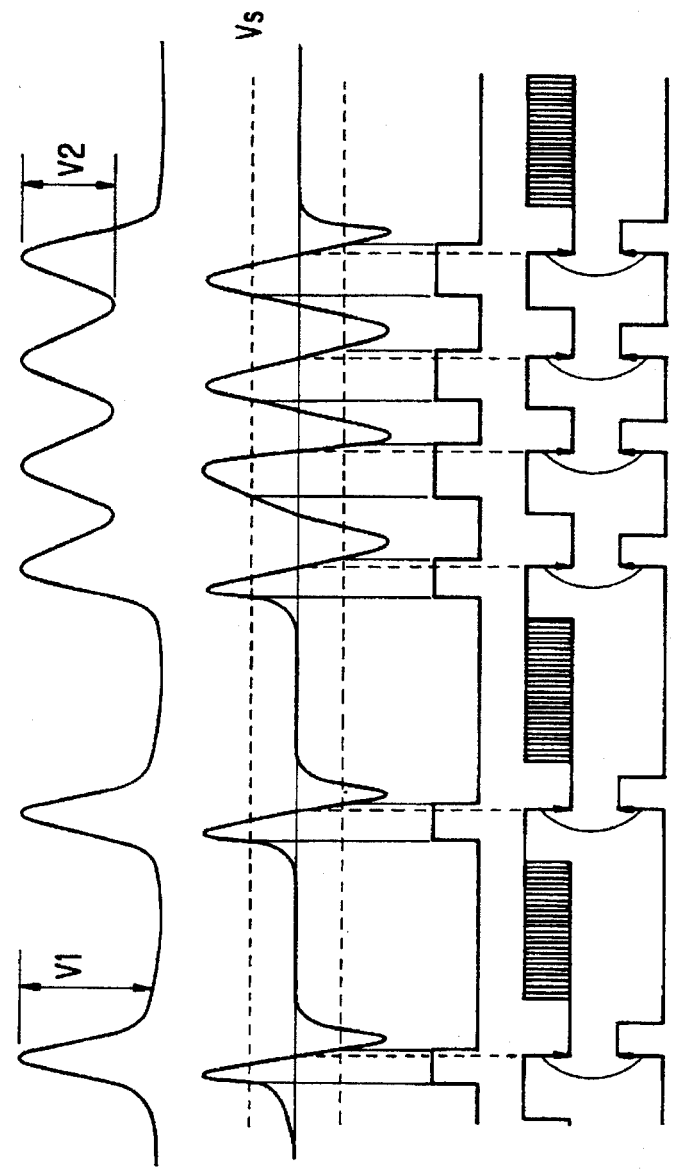
FIG. 27 is a diagram for describing a conventional method of reproducing data.
Figure 28:
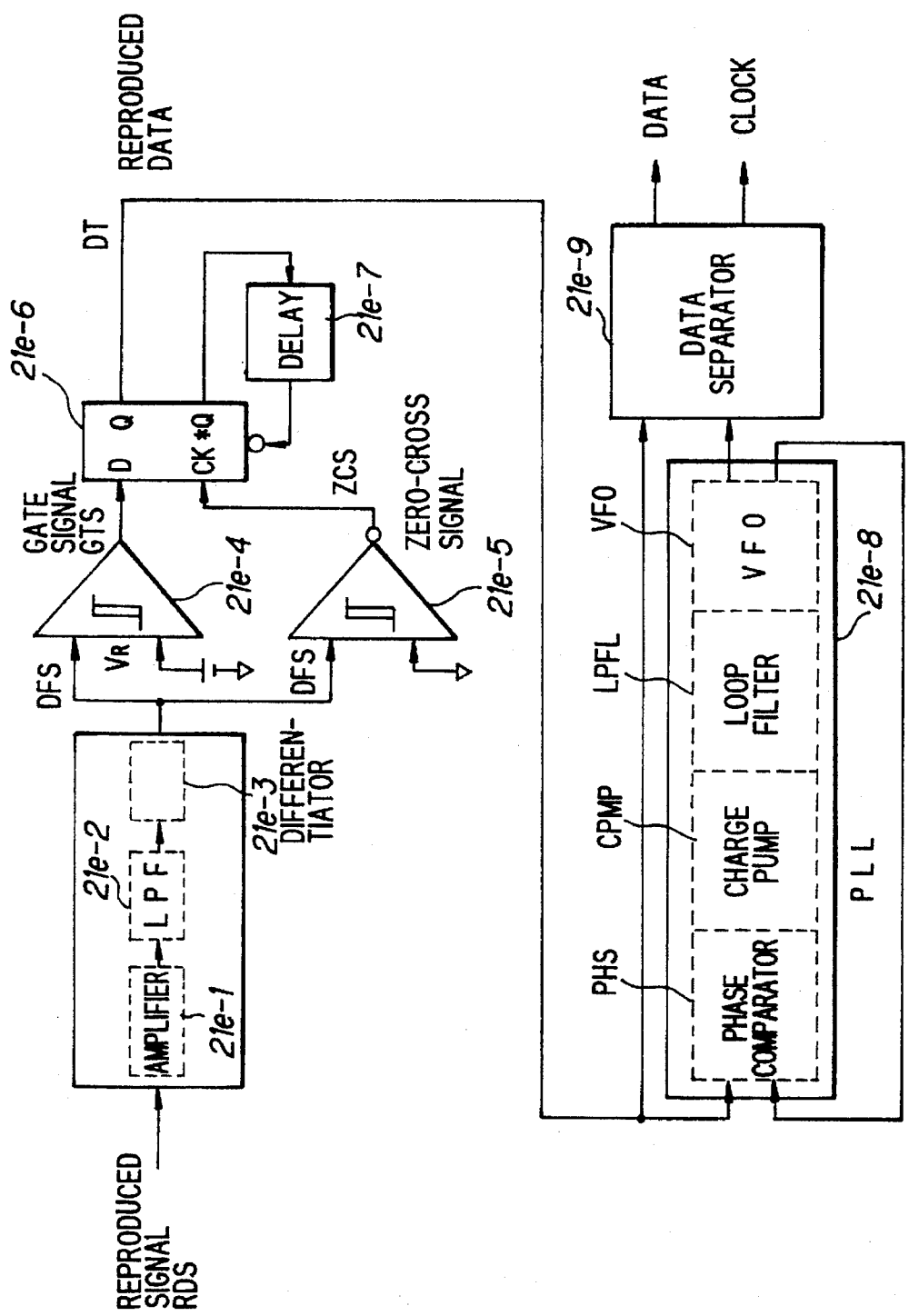
FIG. 28 is a diagram showing the construction of a data reproducing circuit according to the prior art.
Figure 29:
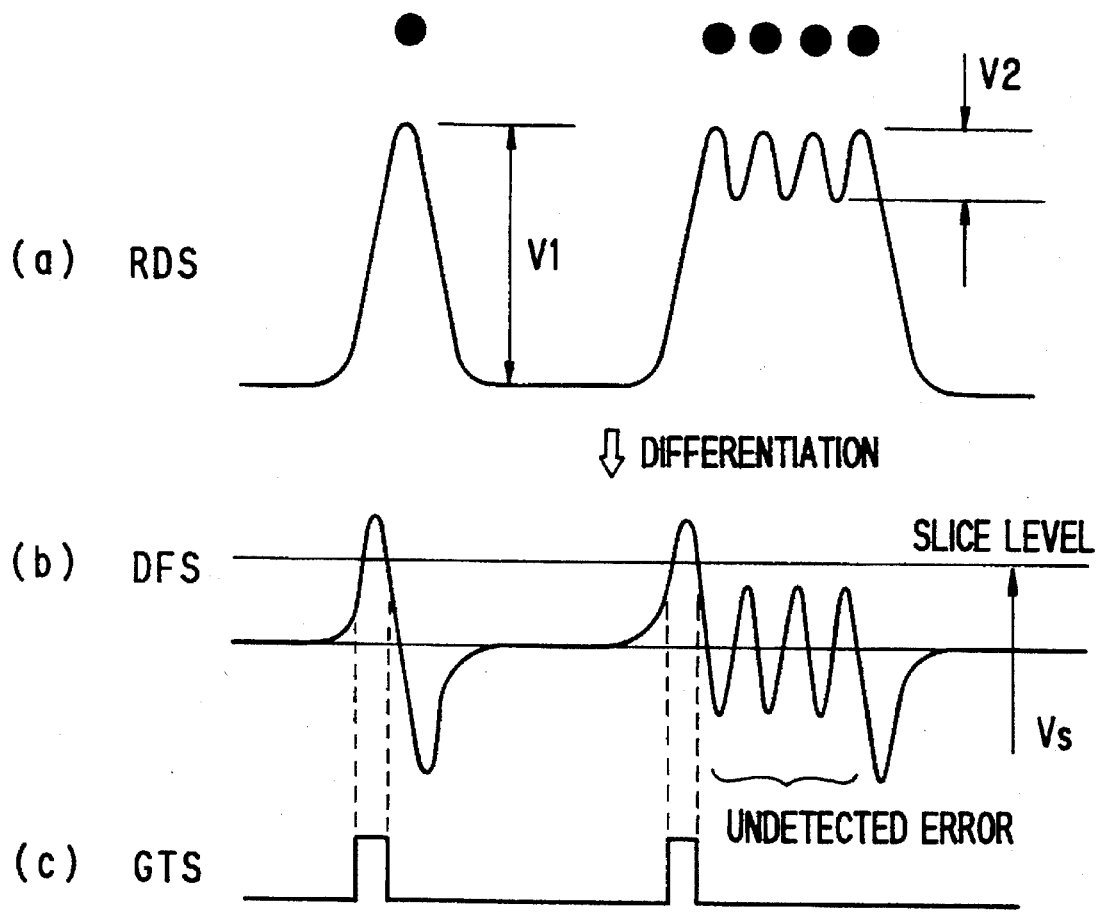
FIG. 29(a)–29(c) are is a diagram for describing problems encountered in the prior art.
Figure 30:
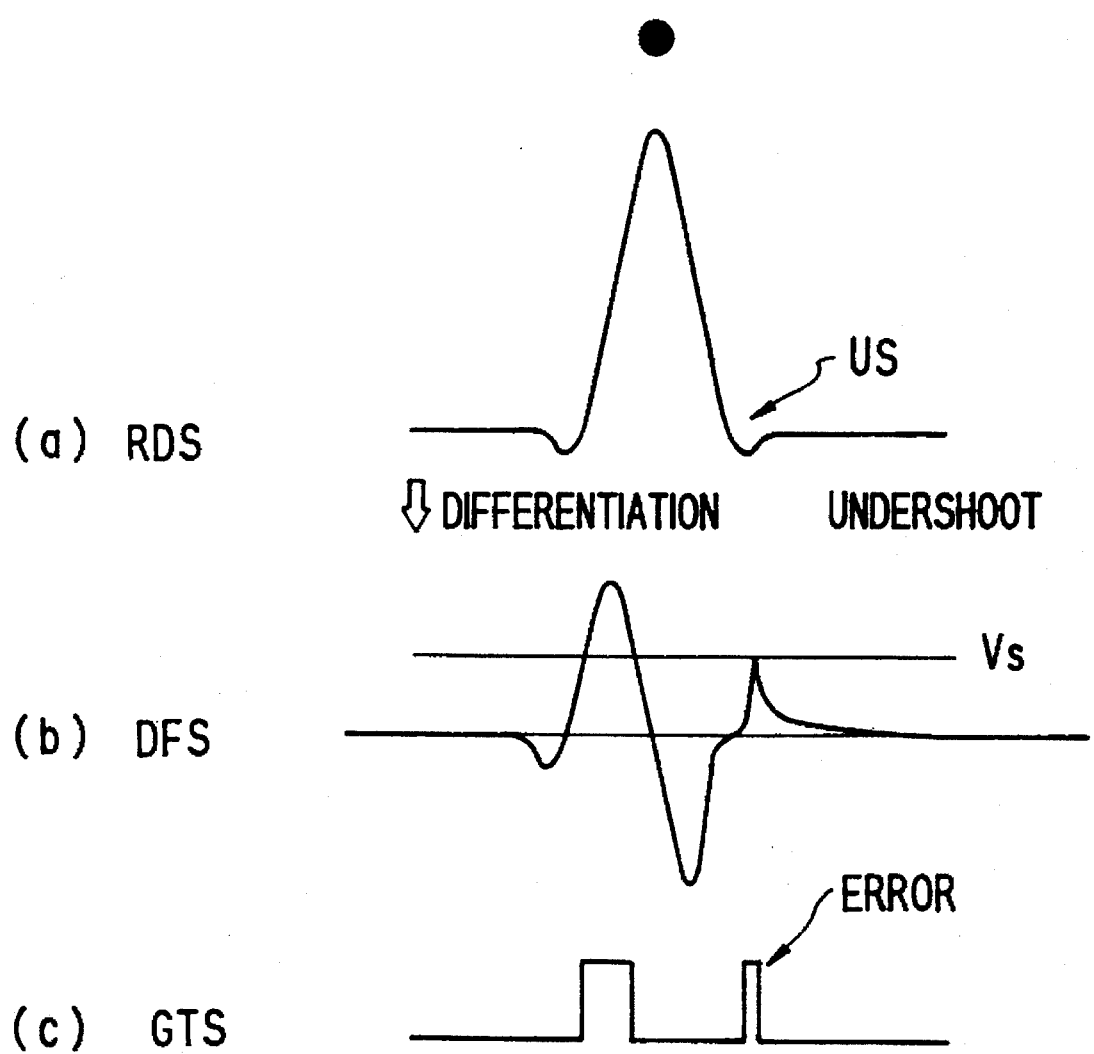
FIG. 30(a)–30(c) are diagram for describing other problems encountered in the prior art.
Figure 31:
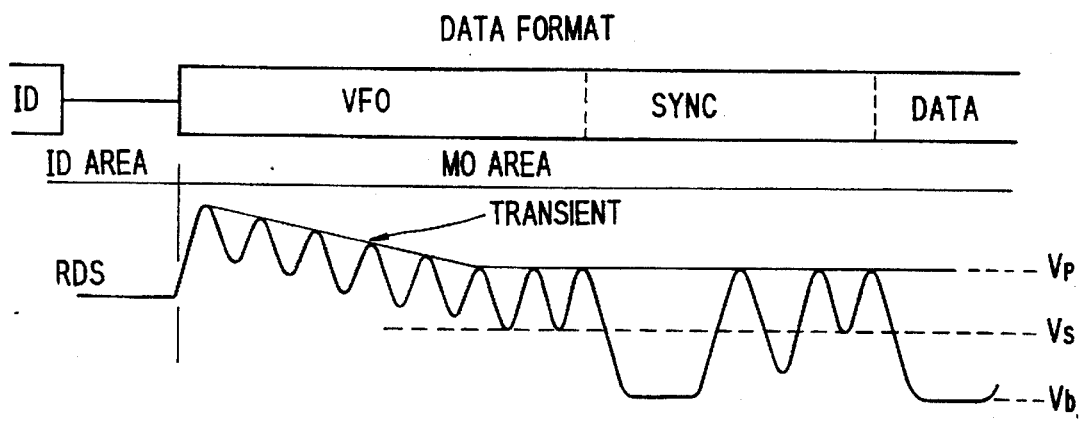
FIG. 31 is a diagram for describing a transient.
Figure 32:
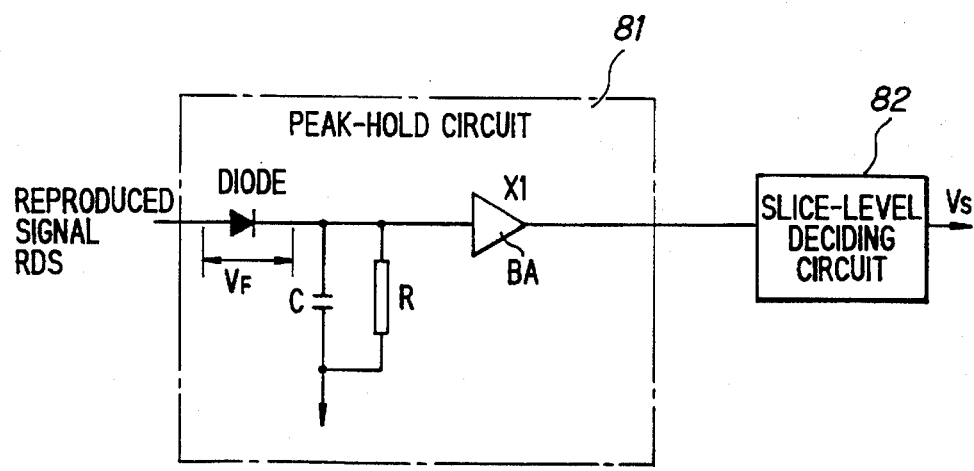
FIG. 32 is a diagram showing an arrangement using a peak-hold circuit according to the prior art.
Figure 33:
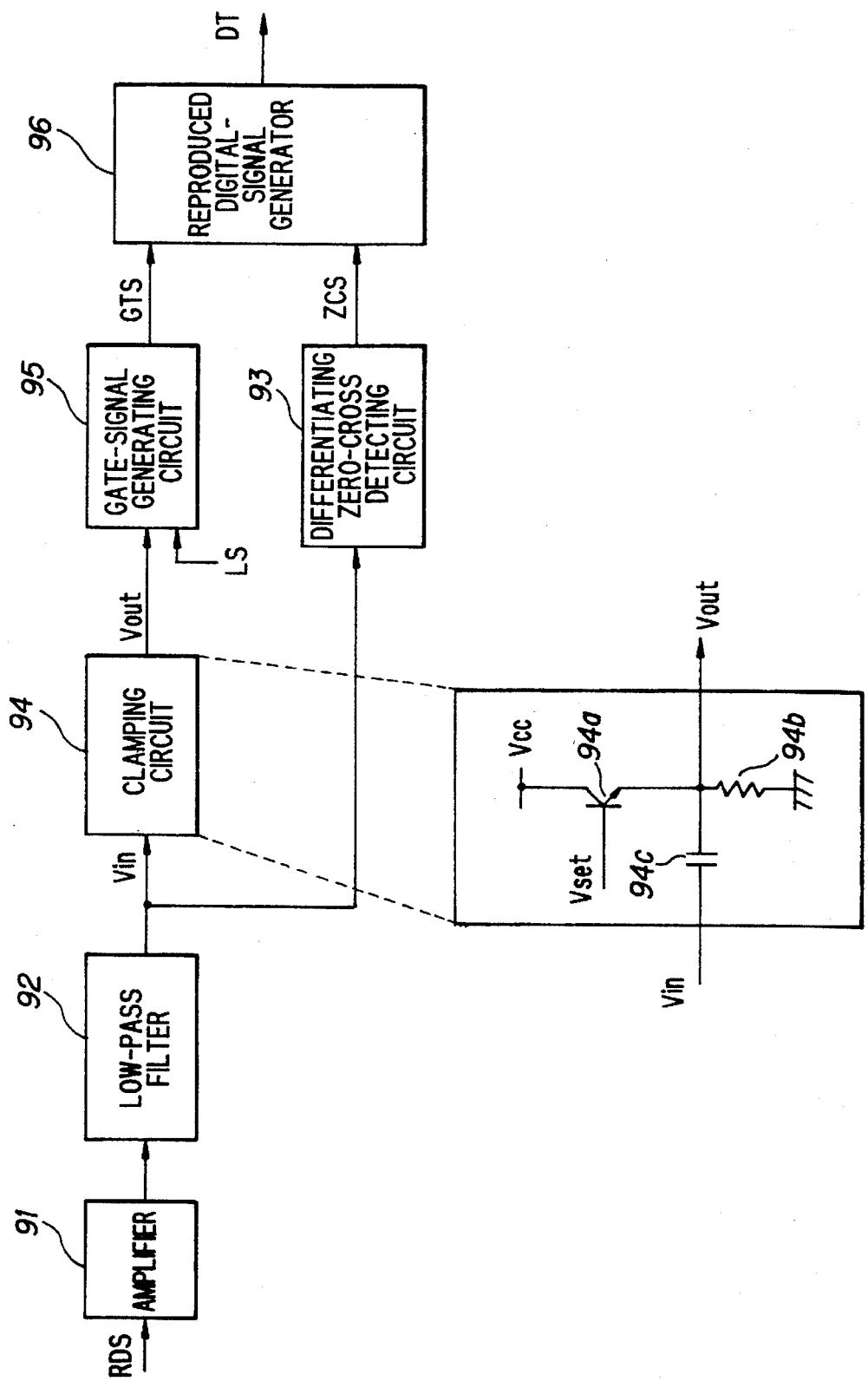
FIG. 33 is a block diagram showing the construction of an information reproducing apparatus according to the prior art.
Figure 34:
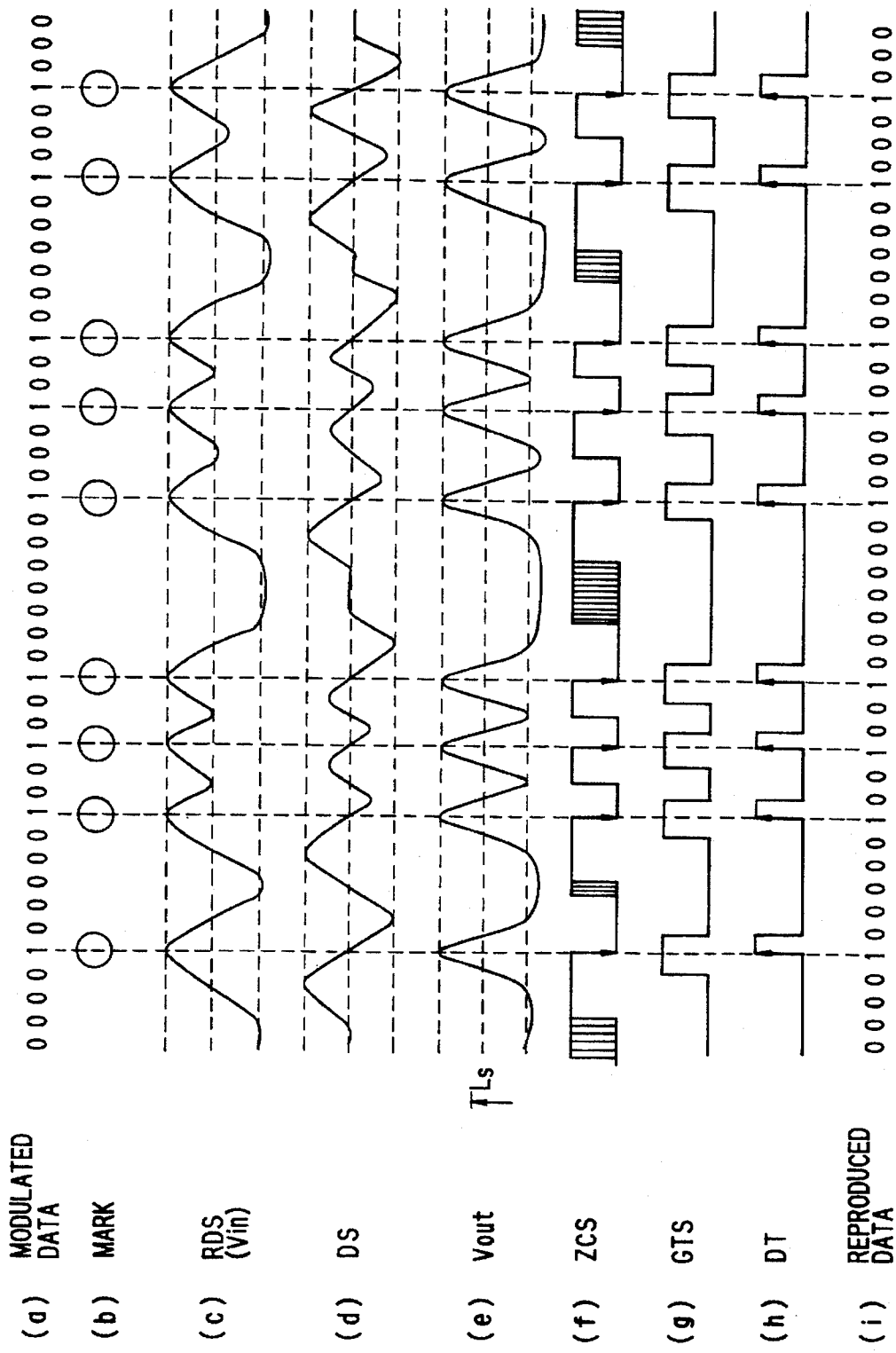
FIG. 34(a)–34(i) are waveform diagrams of waveforms associated with various components of the apparatus of FIG. 33 according to the prior art.
Figure 35:
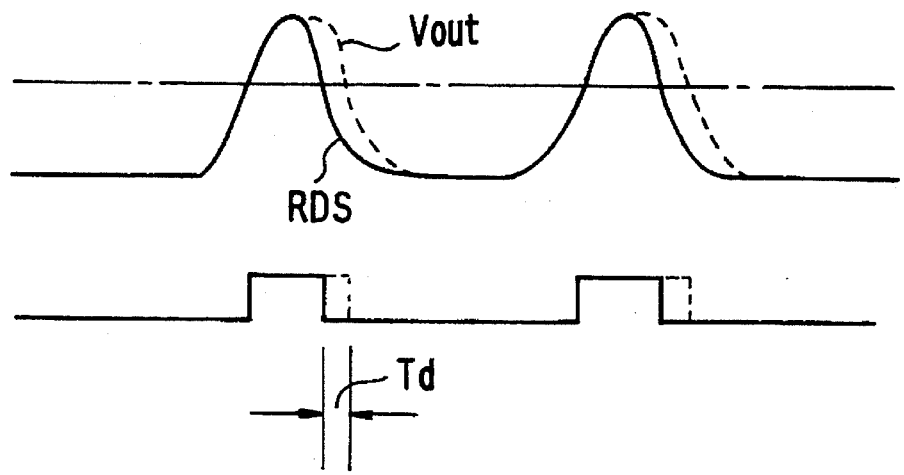
FIG. 35 is a diagram for describing problems of a clamping circuit using a transistor and a diode.
Figure 36:
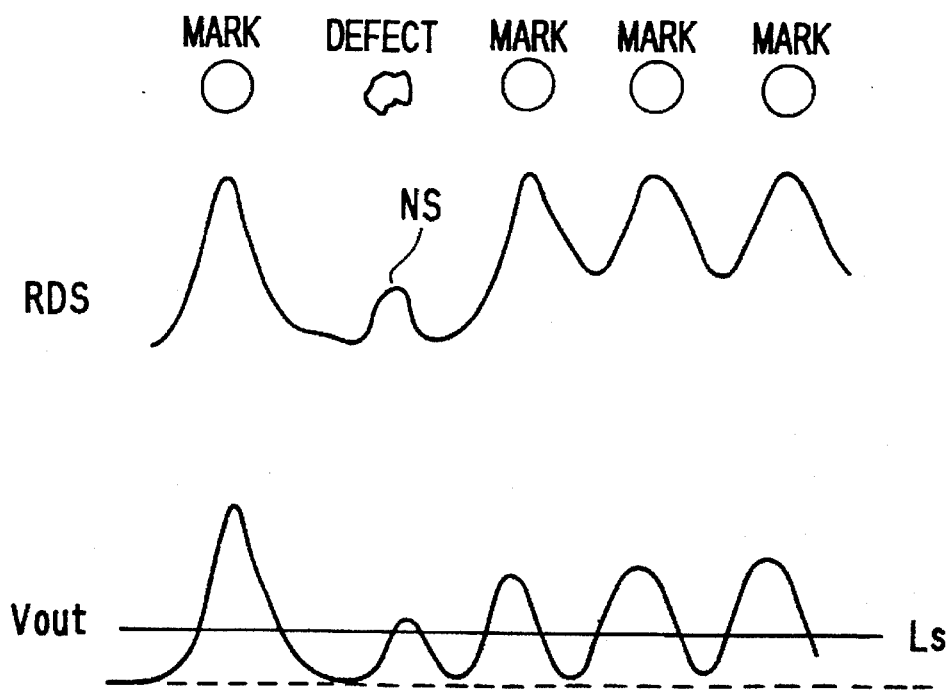
FIG. 36 is a diagram for describing problems of lower-limit level clamping according to the prior art.
Figure 37:
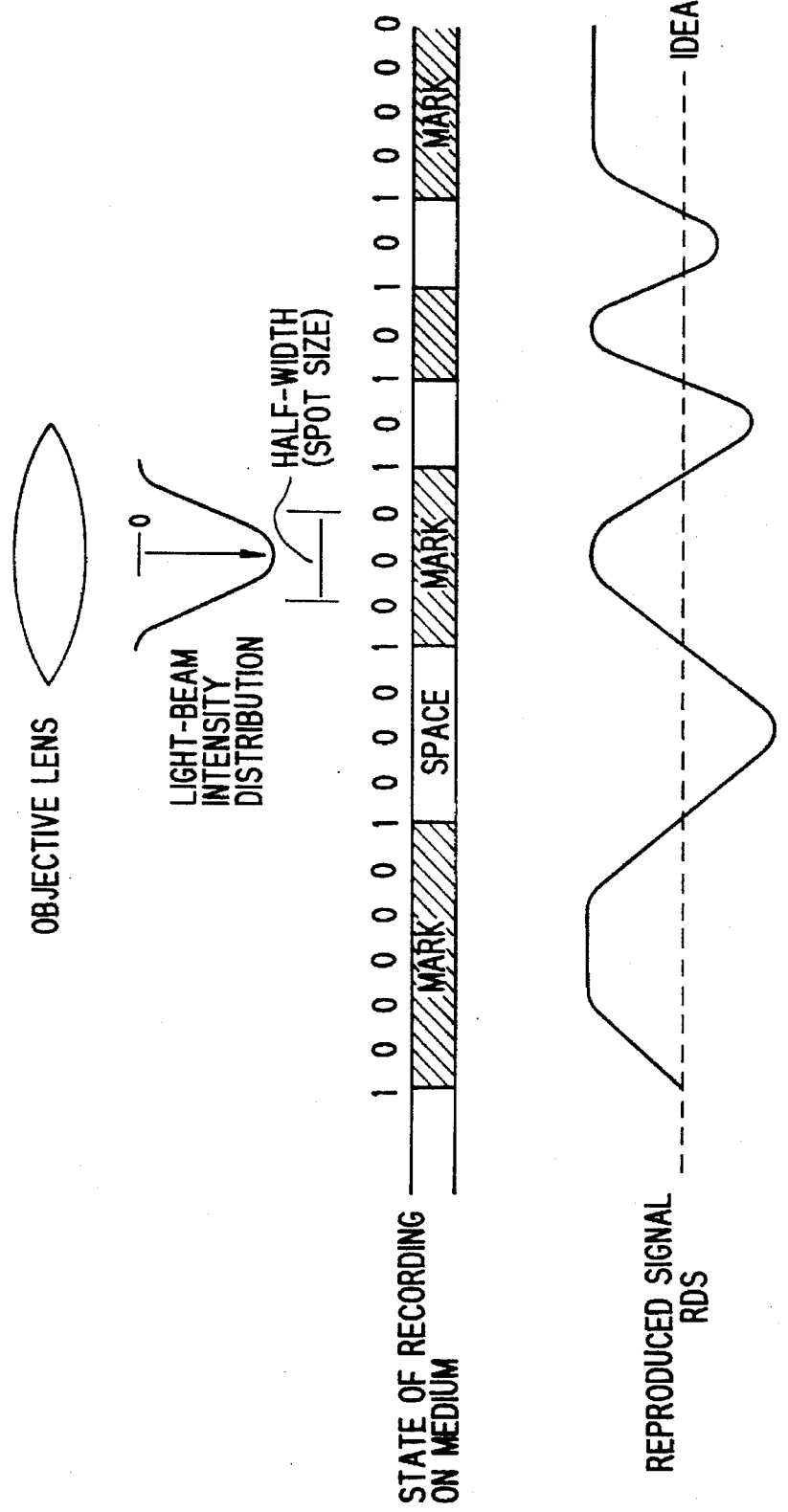
FIG. 37 is a diagram for describing recording and reproduction in which a mark edge is adopted as a "1".

The variable-gain differential amplifier 101 amplifies the reproduced signal read from the optical disk. More specifically, reproduced signals RDS1, RDS2 of opposite polarity enter the amplifier 101, which outputs two signals of opposite polarity. It should be noted that the reproduced signals RDS1, RDS2 correspond to the signals RDS1, RDS2 [see FIG. 25C] outputted by the respective P-wave component detector $21_{11}$ and S-wave component detector $21_{12}$ of FIG. 24. The AGC control unit 102 amplifies the amplitudes of the reproduced signals RDS1, RDS2 to a prescribed value. The two signals of different polarity enter a waveform processor 103 from the variable-gain amplifier 101. The waveform processor 103 has a low-pass filter and an equalizer inserted in order to remove noise in the high-frequency region and suitably emphasize the high-frequency region of the reproduced signals to prevent a decline in resolution and a peak shift.

The clamping circuit 104 clamps the peak values of two reproduced signals RDS1', RDS2' outputted by the waveform processor. With regard to the reproduced signal RDS1', the peak value on the positive side is clamped. As for the reproduced signal RDS2', the peak on the negative side (namely the bottom) is clamped at a fixed value. The gate signal generator (comparator) 105 generates the gate signal GTS upon comparing the voltage levels of clamped signals CLP, CLP' outputted by the clamping circuit 104. The zero-cross signal generating unit 106 differentiates the reproduced signals RDS1', RDS2' outputted by the waveform processor 103 and outputs the zero-cross signal ZCS when a signal representing the difference between the differentiated signals crosses the zero level. The data-pulse output unit 107 outputs a data pulse at the peak point (zero-cross point of the differentiated signal) of the reproduced signal RDS1. The amplitude comparator 108 compares the amplitude of the clamped signal CLP outputted by the clamping circuit 104 and the reference signal voltage Vr and inputs the difference between the amplitudes to the AGC control unit 102. A reference voltage generator 109 generates the reference voltage Vr.

(b) Construction of each unit

Figure 3:
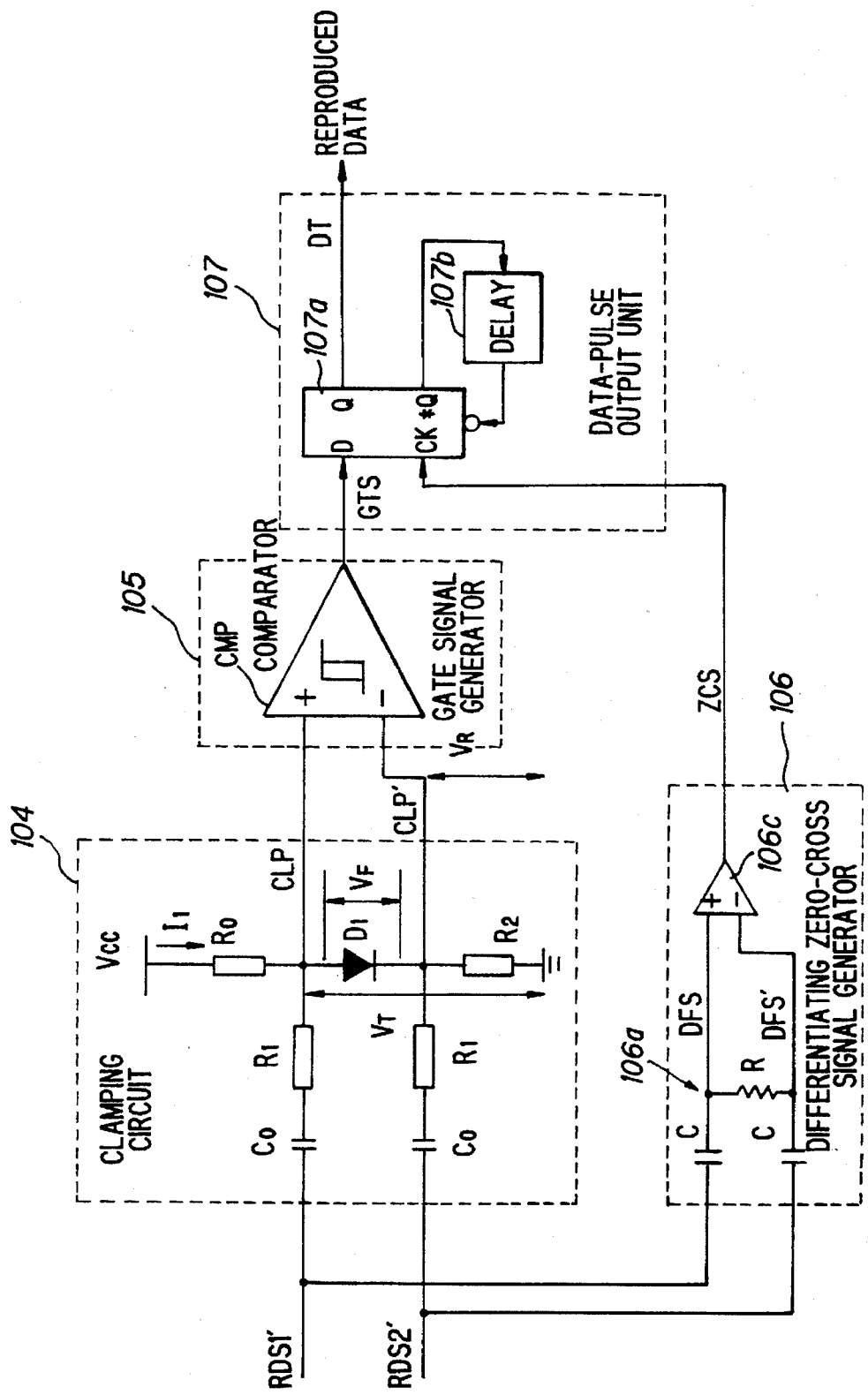
FIG. 3 is a diagram showing the construction of each component in back of a waveform processor.
Figure 4:
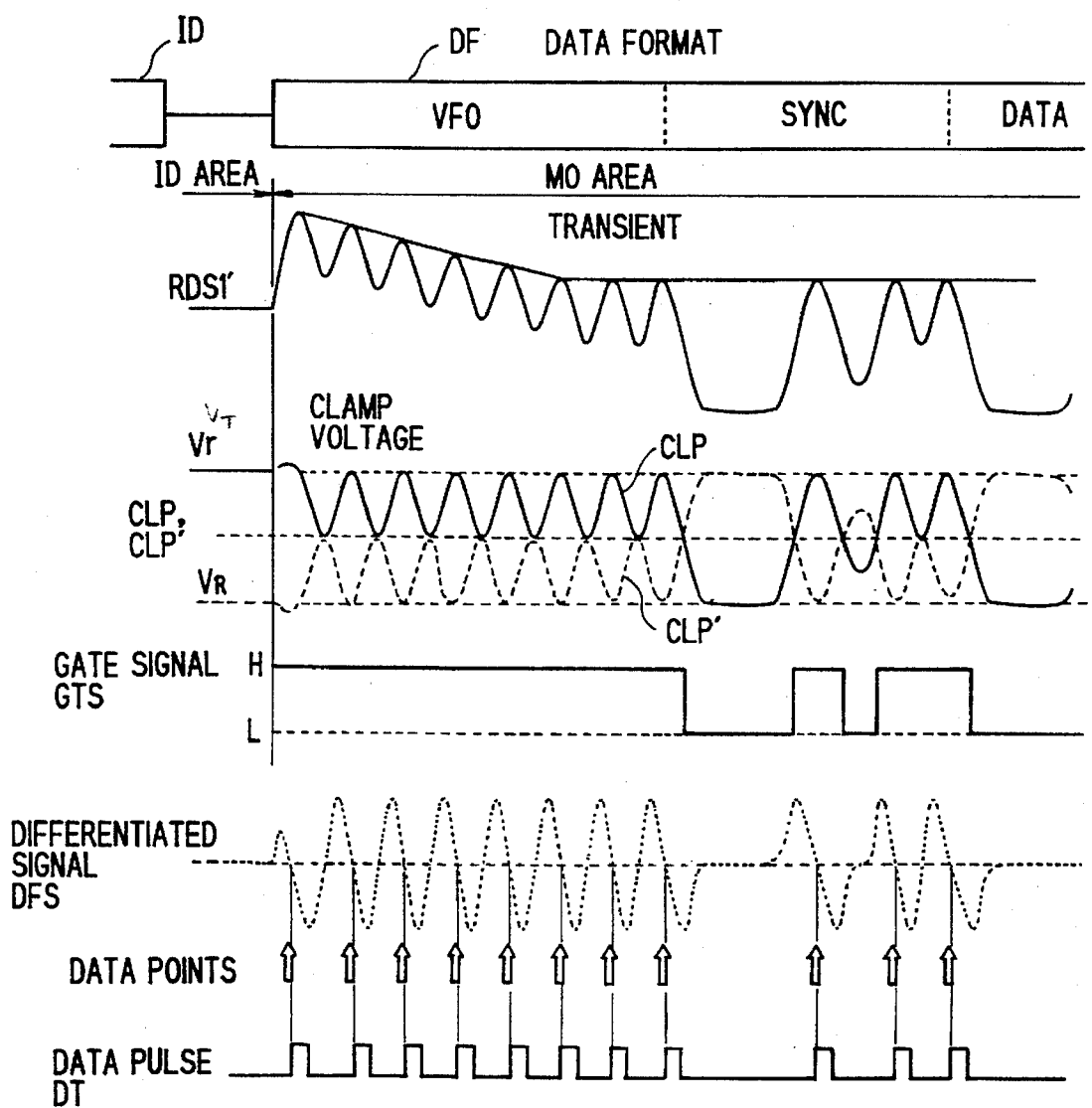
FIG. 4 is a waveform diagram of waveforms associated with various components.

FIG. 3 is a diagram showing the construction of each component in back of the waveform processor 103, and FIG. 4 is a waveform diagram showing the waveforms associated with the various components. In FIG. 4, ID represents an address field (ID area) provided at the head of a sector, and DF a data field (MO area) following the ID area. A VFO pattern for clock extraction, a synch byte SYNC for phase synchronization and user data DATA are written in the MO area.

Clamping circuit

The clamping circuit 104 comprises two capacitors $C_0$ for cutting DC components of the reproduced signals RDS1', RDS2', two current-limiting resistors $R_1$ connected in series with the capacitors $C_0$, biasing resistors $R_0$, $R_2$, and a Schottky diode $D_1$ forwardly biased via these biasing resistors. The anode side of the Schottky diode $D_1$ is connected to the+terminal of a comparator CMP constituting the gate signal generator 105, and the cathode side of this diode is connected to the−terminal of the comparator CMP. Since the Schottky diode $D_1$ theoretically is entirely unaffected by accumulated electric charge, the signal delay is negligible in comparison with a clamping circuit using a transistor or another type of diode.

In the absence of an input signal, the potential at the non-inverting terminal (+) of the comparator CMP is fixed at a potential ($V_T = I_1 \cdot R_2 + V_F$), which is obtained by adding the forward voltage $V_F$ of the Schottky diode $D_1$ to the potential at the inverting terminal (−).

When the signal RDS1' having a transient shown in FIG. 4 enters under these conditions, the rising potential at the start of the transient is held at a fixed voltage because the Schottky diode $D_1$ is ON, and the signal is clamped at $V_T$, as indicated by the clamped signal CLP in FIG. 4. A current-limiting resistor $R_1$ connected in parallel with the capacitor CO acts to lighten the burden on the driver that drives the clamping system. More specifically, at the time of rising potential at the start of the transient, diode clamping is performed and hence there is the danger that a large current might flow in the absence of the current-limiting resistor R1. However, since the current-limiting resistor R1 is provided, current is limited and burden on the driver is alleviated. If the current-limiting resistor $R_1$ is made too large, however, the clamping circuit will no longer operate. Accordingly, a suitable value for the resistor R1 is several tens of ohms.

When the input signal RDS1' falls, a current path is formed in the manner $V_{cc} \rightarrow R_0 \rightarrow R_1 \rightarrow C_0$ signal terminal and the voltage (clamped signal CLP) at the non-inverting terminal of the comparator CMP varies while following up the input signal RDS1', as shown in FIG. 4. At this time the capacitor $C_0$ is charged with electric charge but a discharge is effected via the resistor R1 and Schottky diode D1 when the input signal RDS1' rises.

Accordingly, the transient at the start of data and envelope fluctuation accompanying a change in reflectivity are absorbed and the peak value of the reproduced signal is clamped at $V_T$. Below $V_T$ the signal waveform follows up the input signal RDS1'. The foregoing is for a case in which the focus of attention is directed to the input signal RDS1'. As for the input signal RDS2', the clamped signal CLP' has its bottom clamped at $V_R$. Above $V_R$ the waveform follows up the input signal RDS1'. This is indicated by the dashed line in FIG. 4.

The time constant $\tau$ ($\tau = C_0 \cdot R$, where $R=R_0$ or $R=R_1$) decided by the capacitor $C_0$ and diode biasing resistor $R_0$ in the clamping circuit 104 is required to be greater than the longest pattern of the input signal (the time from one peak point to the next is the longest pattern). The reason for this is that the bottom level cannot be maintained below this value. For example, the RLL (2,7) encoding method is employed as the five-inch or 3.5-inch recording format according to ISO standards. In accordance with RLL (2,7) coding, the number of "0"s between "1" bits after encoding varies from two to seven, and the longest pattern is 8T, where T represents the bit interval. Accordingly, it is required that the time constant $\tau$ ($=C_0 \cdot R$) be made larger than 8T. Further, the upper limit of the time constant is decided by the VFO pattern duration provided in order to extract the clock component from the data at the beginning of data. The reason for this is that in a case where a transient which is the reverse of that shown in FIG. 4 has occurred at the start of data (i.e., a case where a transient in the opposite direction has occurred owing, say, to the effect of ID crosstalk occurring immediately prior thereto), it is required that the transient be damped (ended) within the term of VFO in which peak clamping operates.

Gate signal generator

The gate signal generator 105 is constituted by the comparator CMP having the non-inverting terminal (+) to which the clamped signal CLP is applied, and the inverting terminal (−) to which the clamped signal CLP' is applied. The comparator outputs the high-level gate signal GTS when the potential at the non-inverting terminal is greater than the potential at the inverting terminal.

Differentiating zero-cross signal generator

The differentiating zero-cross signal generator 106 has a differentiating circuit 106a, which is constituted by capacitors and a resistor, for outputting differentiated signals DFS, DFS' obtained by differentiating the reproduced signals RDS1', RDS2', and a comparator 106c for outputting the high-level zero-cross signal ZCS when a signal indicating the difference between the differentiated signals DFS, DFS' falls below the zero level.

Data-pulse output unit

The data-pulse output unit 107 is adapted to output a data pulse (reproduced data) when the zero-cross signal ZCS is generated while the gate signal GTS is being produced, namely at the peak point of the reproduced signal RDS1. Numeral 107a denotes a flip-flop and 107b a delay element for setting a prescribed delay time. When the zero-cross signal ZCS is generated with the gate signal GTS at the high level, the flip-flop 107a is set and then is reset upon elapse of the delay time. As a result, the data pulse DT, the width of which corresponds to the delay time, is outputted.

It should be noted that the data-pulse output unit 107 can be constructed from an AND gate, wherein the AND gate takes the AND between the gate signal GTS and zero-cross signal ZCS to output the data pulse DT.

Construction of feedback system

Figure 5:
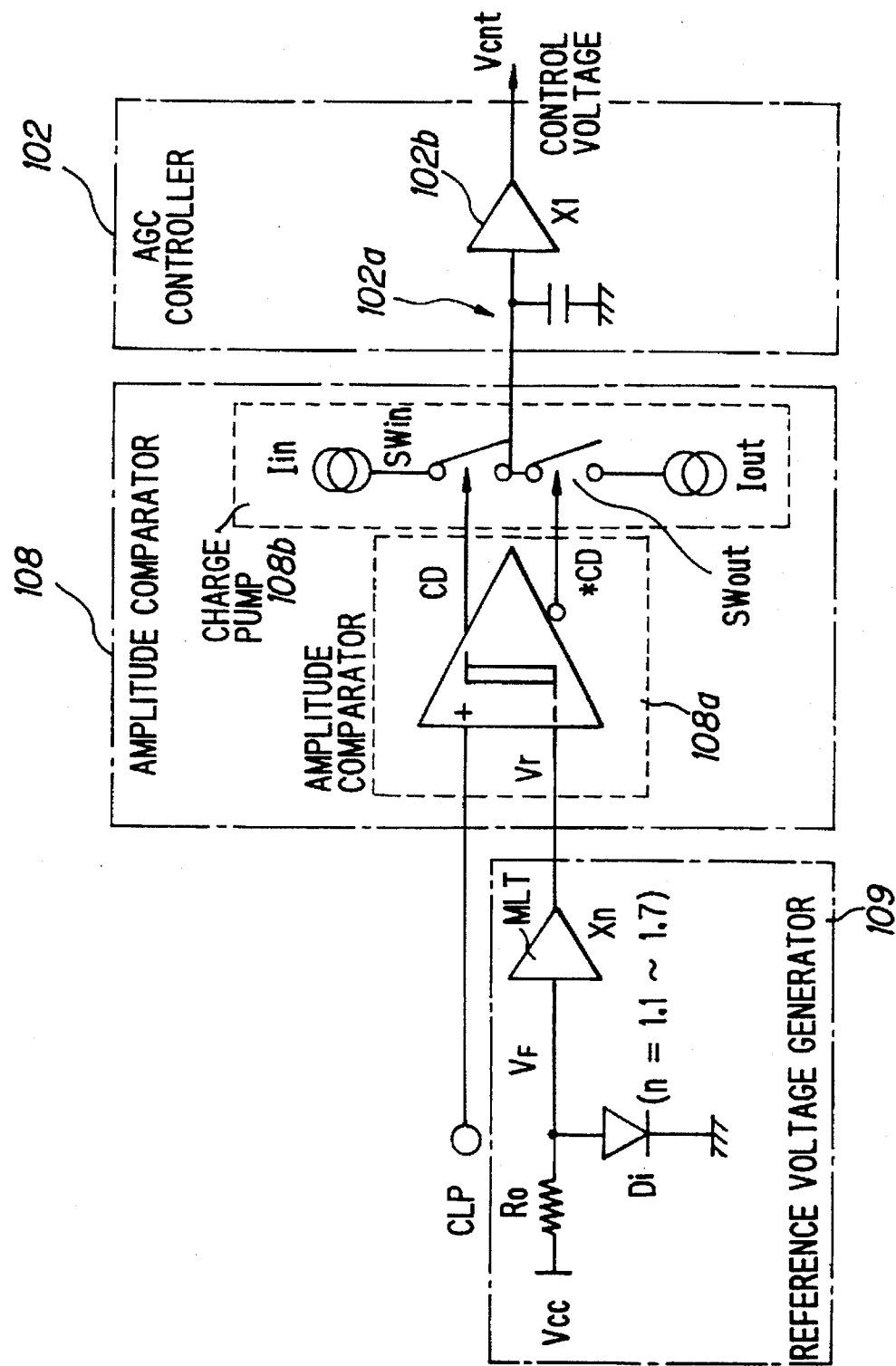
FIG. 5 is a diagram showing the construction of an amplitude feedback system.
Figure 6:
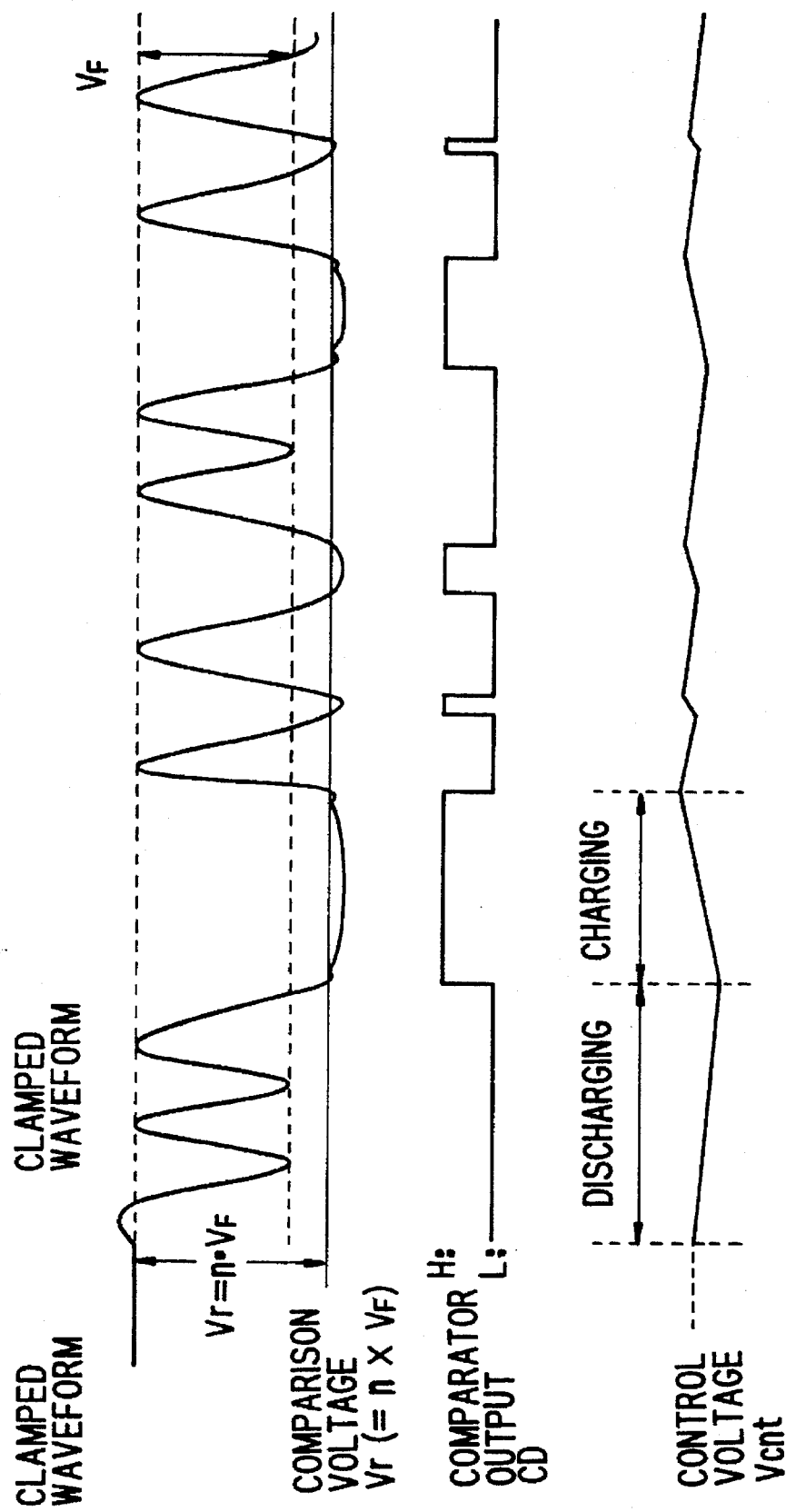
FIG. 6 is a waveform diagram for describing the operation of the amplitude feedback system.

FIG. 5 is a diagram showing the construction of an amplitude feedback system for feeding the clamped signal amplitude back to the variable-gain amplifier 101, and FIG. 6 is a waveform diagram for describing the operation of the amplitude feedback system. The amplitude comparator 108 outputs the amplitude difference between the amplitude of the clamped signal CLP outputted by the clamping circuit and the reference voltage level Vr, and the AGC control unit 102 generates the control voltage signal Vcnt conforming to the amplitude difference. The reference voltage generator 109 generates the reference voltage Vr, which is n (=1.1~1.7) times the forward-voltage drop Vof the Schottky diode $D_1$ constituting the clamping circuit 104. The reason for the relation n=1.1~1.7 will be described later.

The amplitude comparator 108 includes an amplitude comparator element 108a for comparing the reference voltage Vr with the amplitude of the clamped signal CLP entering from the clamping circuit, and a charge pump 108b, which comprises constant-current sources Iin, Iout and switches SWin, SWout. The charge pump 108b sucks in and expels charge by turning the switches SWin, SWout on and off on the basis of the output from the amplitude comparator element 108a. The AGC control unit 102 includes a low-pass filter 102a for converting the current output of the charge pump to voltage, and a buffer amplifier 102b for delivering the output of the low-pass filter as the control voltage signal Vcnt.

The reference voltage generator 109 is provided in the vicinity of the clamping circuit 104 and has a Schottky barrier diode $D_1$' whose characteristics are identical with those of the Schottky barrier diode $D_1$ of the clamping circuit 104, a biasing resistor $R_0$ for biasing the diode in the forward direction, and a multiplier (e.g., an amplifier) MLT for multiplying the forward-voltage drop $V_F$ of the Schottky diode $D_1$' by n (=1.1~1.7).

The forward-voltage drop $V_F$ of the Schottky diode $D_1$' is multiplied by n (=1.1~1.7) in the multiplier MLT and the product is applied to the−terminal of the comparator 108a. Meanwhile, the clamping circuit CLP is applied to the+ terminal of the comparator 108a. The latter compares the amplitudes of its two inputs and outputs a low-level drive signal CD if the clamped signal amplitude is less than $V_r$ (=n·$V_F$) and a high-level drive signal if the clamped signal amplitude is greater than n·$V_F$. If the drive signal CD is at the low level, the switch SWout turns on and the electric charge that has accumulated in the capacitor of the low-pass filter 102a is discharged. Conversely, if the drive signal CD is at the high level, the switch SWin turns on and the capacitor of the low-pass filter 102a is charged with electric charge. As a result, the control voltage signal Vcnt, which increases or decreases in dependence upon the amplitude of the clamped signal CLP, as shown in FIG. 6, is outputted by the low-pass filter 102a.

Though a case is illustrated in which the low-pass filter 102a is composed solely of the capacitor [transfer function F(s)=1/sC], it is permissible to use a secondary filter [transfer function F(s)=R+1/sC] composed of a resistor and a capacitor connected in series. The principle of operation is entirely the same as that for the capacitor alone even if a secondary filter is employed. Whichever arrangement is selected will depend upon the system design.

With regard to the amplitude comparator 108, it is possible to reduce AGC attack time by increasing the charge/discharge currents Iin, Iout at draw-in of AGC at the start of data and then subsequently decreasing In, Iout. As a result, response time of the variable-gain amplifier 101 diminishes under the control of the AGC control unit 102, described later, and the adverse effects of a fluctuation in amplitude based upon the data pattern can be eliminated.

Variable-gain amplifier

Figure 7:
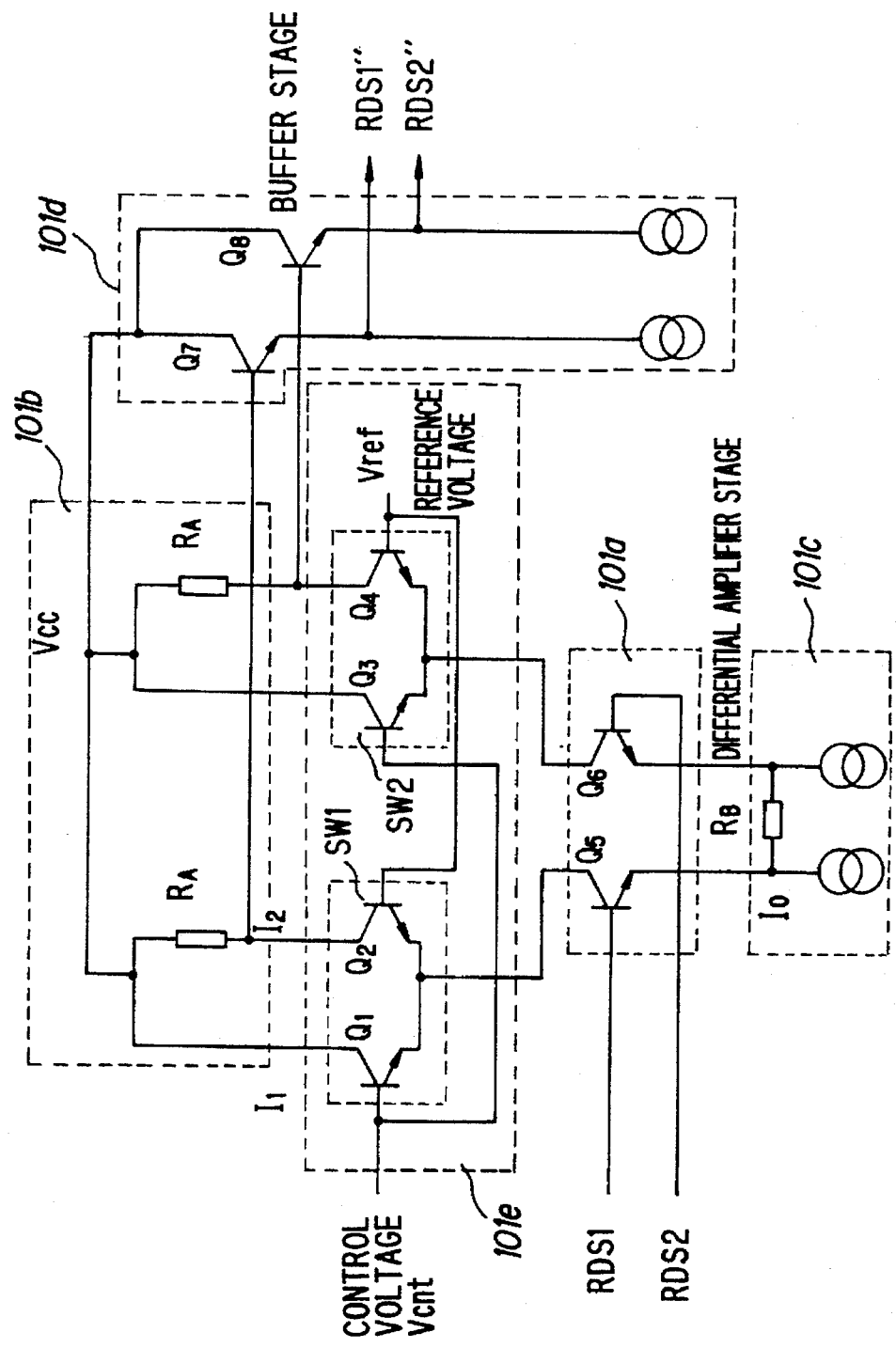
FIG. 7 is a diagram showing the construction of a variable-gain amplifier.

FIG. 7 is a diagram showing the construction of the variable-gain amplifier. The arrangement of FIG. 7 is referred to as a Gilbert cell and is already finding use in many circuits. The variable-gain amplifier 101 includes a differential amplifier 101a having transistors Q5, Q6 and inputs which are the reproduced signals RDS1, RDS2 of different polarity, a biasing unit 101b which supplies current to each of the transistors of amplifier 101a, a constant-current unit 101c, an output buffer 101d and a transistor switch 101e.

The transistor switch 101e has two sets of transistor switches SW1 ($Q_1$, $Q_2$) and SW2 ($Q_3$, $Q_4$) for controlling the gain of the differential amplifier 101a in dependence upon the magnitudes of the control voltage signal Vcnt outputted by the AGC control unit 102 and the preset reference voltage Vref. The transistor switch 101e compares the control voltage signal Vcnt and the reference voltage Vref, and controls the conductivity of the transistors $Q_1$~$Q_4$ in such a manner that the reference voltage and control voltage become equal, thereby controlling the gain of the differential amplifier 101a so that the amplitudes of the reproduced signals RDS1, RDS2 are made the optimum value.

The principle of operation will now be described in brief. The differential input signals (reproduced signals) RDS1, RDS2 enter the respective transistors $Q_5$, $Q_6$ of the differential amplifier 101a. The transistor switches SW1, SW2 constructed by the transistors $Q_1$, $Q_2$ and $Q_3$, $Q_4$, respectively, are connected to the loads of the transistors. The control voltage signal Vcnt is applied to the base of one transistor in each switch, and the reference voltage signal Vref is applied to the base of the other transistor in each switch. In a case where the inequality (reference voltage Vref)>(control voltage signal Vcnt) holds, the transistors $Q_2$, $Q_4$ turn on and the transistors $Q_1$, $Q_3$ turn off. As a result, the reproduced signals RDS1, RDS2 appear at load resistors $R_A$ of the transistors $Q_2$, $Q_4$ and become input signals RDS1", RDS2" of the waveform processor 103, which is the next stage of the circuitry, via transistors $Q_7$, $Q_8$ of the buffer 101d. Maximum gain is attained at this time and the voltage gain is $R_A/R_B$.

In a case where the inequality (reference voltage Vref)< (control voltage signal Vcnt) holds, the transistors $Q_1$, $Q_3$ turn on and the transistors $Q_2$, $Q_4$ turn off. As a result, the reproduced signals RDS1, RDS2 do not appear at all at the load resistors $R_A$ and the gain becomes zero. In actuality, control is performed by a feedback loop in such a manner that the relation (reference voltage Vref)≈(control voltage signal Vcnt0 is established. As a result, the signal amplitude of the clamped signal CLP is the product of multiplying the forward voltage drop $V_F$ of the Schottky barrier diode $D_1$ by n (=1.1~1.7).

(c) Level Margin

In the embodiment of FIG. 3, the slice level for creating the gate signal GTS is decided solely by the forward voltage drop $V_F$ of the Schottky barrier diode $D_1$, and the forward voltage drop $V_F$ and amplitude of the clamped signal are closely related to level margin when creating the gate signal GTS. In general, the forward voltage drop $V_F$ of the Schottky barrier diode is strongly dependent upon the temperature and tends to decline the higher the junction-surface temperature. When generation of heat during operation of an optical disk at environmental temperature (5°~45° C.) is considered, variation of junction-surface temperature ranges from 0° C. to 80° C. Owing to such a change in temperature, $V_F$ varies by a factor of two or by nearly one half. Consequently, in order to improve level margin, it is necessary to control the reproduced signal, namely the amplitude of the clamped signal, in dependence upon the change in $V_F$. On the other hand, the amplitude of the reproduced signal fluctuates nearly twofold at maximum depending upon the reflectivity of the optical disk, the performance of the medium and the efficiency of reproduction. This means that if the amplitude of the reproduced signal fluctuates, it is necessary to perform control to obtain an appropriate amplitude commensurate with $V_F$.

Figure 8:
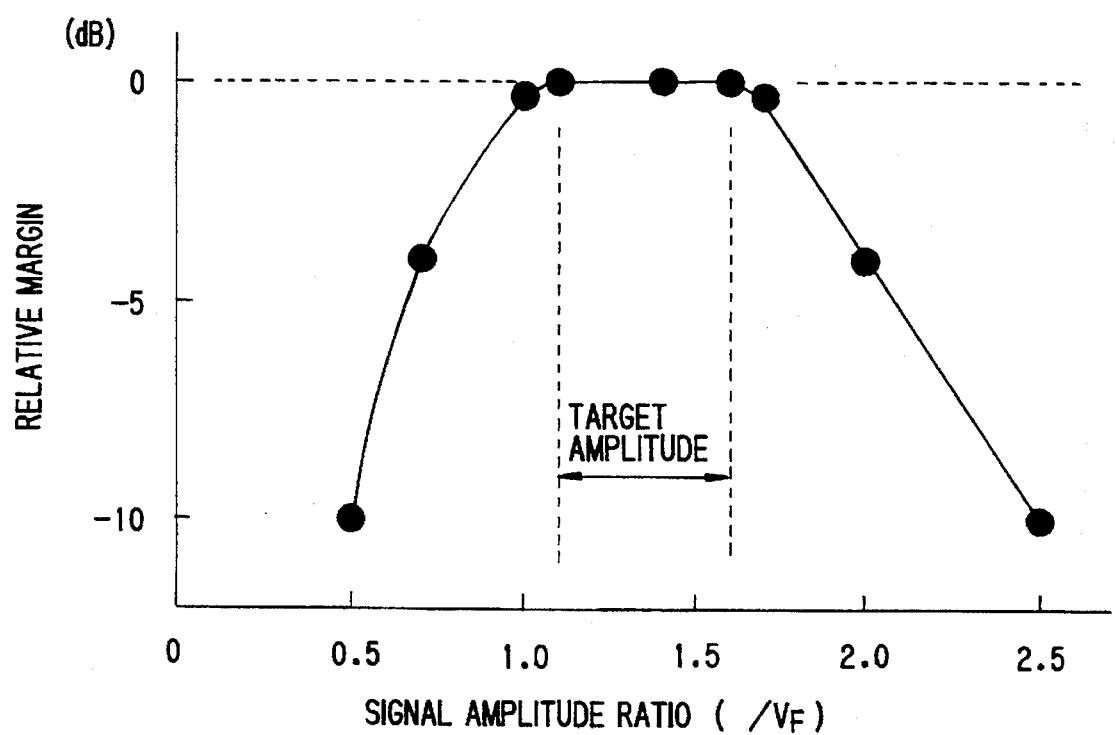
FIG. 8 is a diagram for describing the results measuring margin vs. signal amplitude.

FIG. 8 illustrates an example of measurement of level margin vs. clamped signal amplitude in the arrangement of the embodiment shown in FIGS. 2 and 3. FIG. 8 shows signal amplitude ratio [(signal amplitude)/VF)] and deterioration in level margin when the gate signal is created. It will be understood that the characteristic is best when the ratio of the signal amplitude of the clamped signals CLP, CLP', which are applied to the gate signal generator 105, to $V_F$ is 1.1~1.7.

In order to clear the target amplitude, the product of multiplying the forward-voltage drop $V_F$ of the diode by 1.1~1.7 is generated as the reference voltage $V_r$. The difference between the reference voltage Vr and the signal amplitude of the clamped signal CLP is detected by the amplitude comparator 108, the control voltage signal Vcnt commensurate with the difference is outputted by the AGC control unit 102 to thereby control the gain of the variable-gain amplifier 101. As a result, feedback control is performed in such a manner that the signal amplitude of the clamped signal CLP becomes the product of multiplying the forward voltage drop $V_F$ of the Schottky barrier diode $D_1$ by n (=1.1~1.7).

(d) Modification

The foregoing relates to a case in which prescribed processing is executed by the variable-gain amplifier, waveform processor, clamping circuit and gate signal generator using the reproduced signals RDS1, RDS2 of opposite polarity. However, an arrangement can be adopted in which the data pulse DT is generated using the reproduced signal RDS obtained by computing the difference between the reproduced signals RDS1, RDS2.

Figure 9:
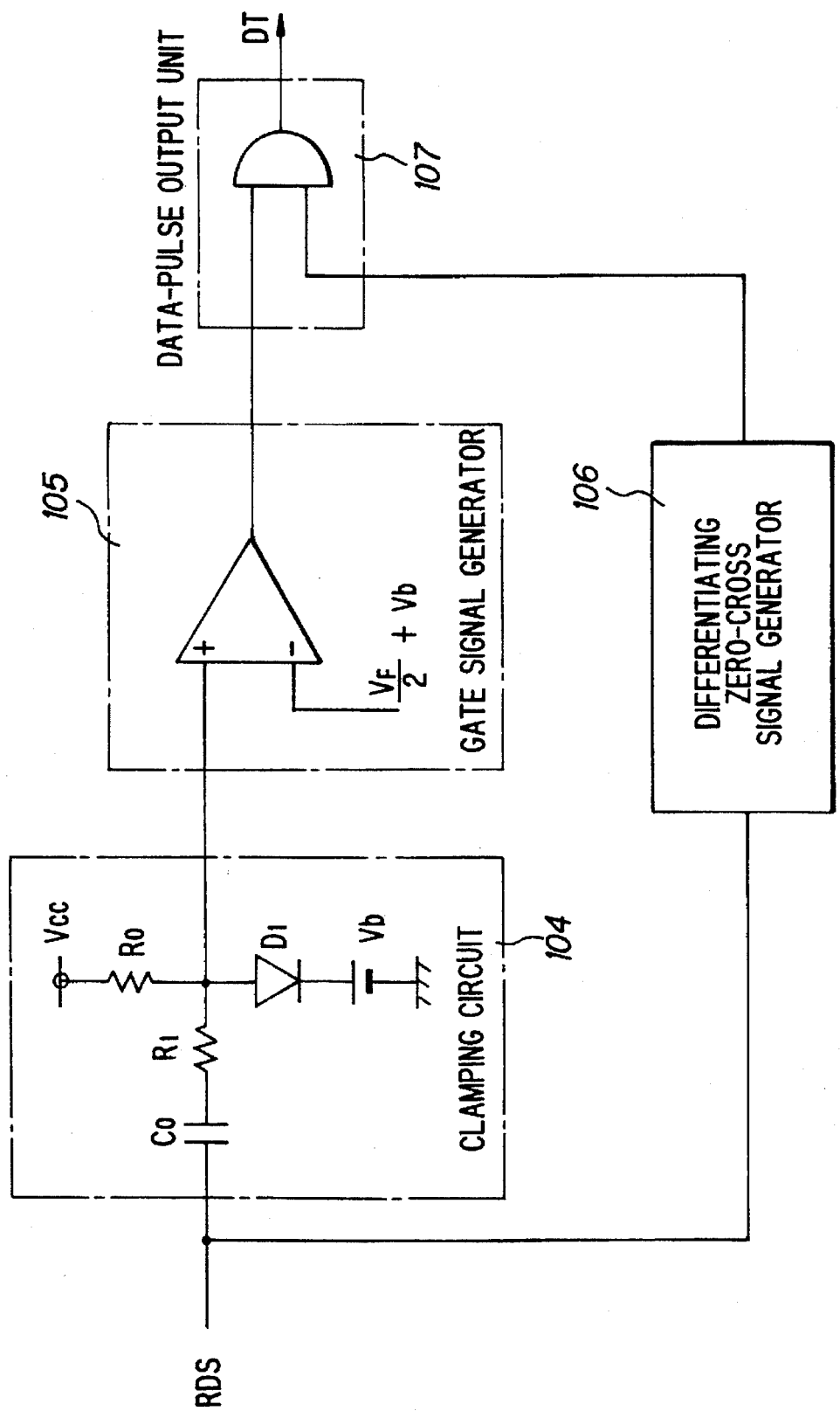
FIG. 9 is a diagram illustrating the arrangement of components illustrating a modification of the invention.

In such case the circuitry from the clamping circuit onward would be as shown in FIG. 9. In comparison with the arrangement of FIG. 3, here the clamping circuit 104 need deal with only one input signal, the clamping signal CLP enters the non-inverting terminal (+) of the gate signal generator 105, and Vb+$V_F$/2 (where $V_F$ is the forward-voltage drop) enters the inverting terminal (−).

Figure 10:
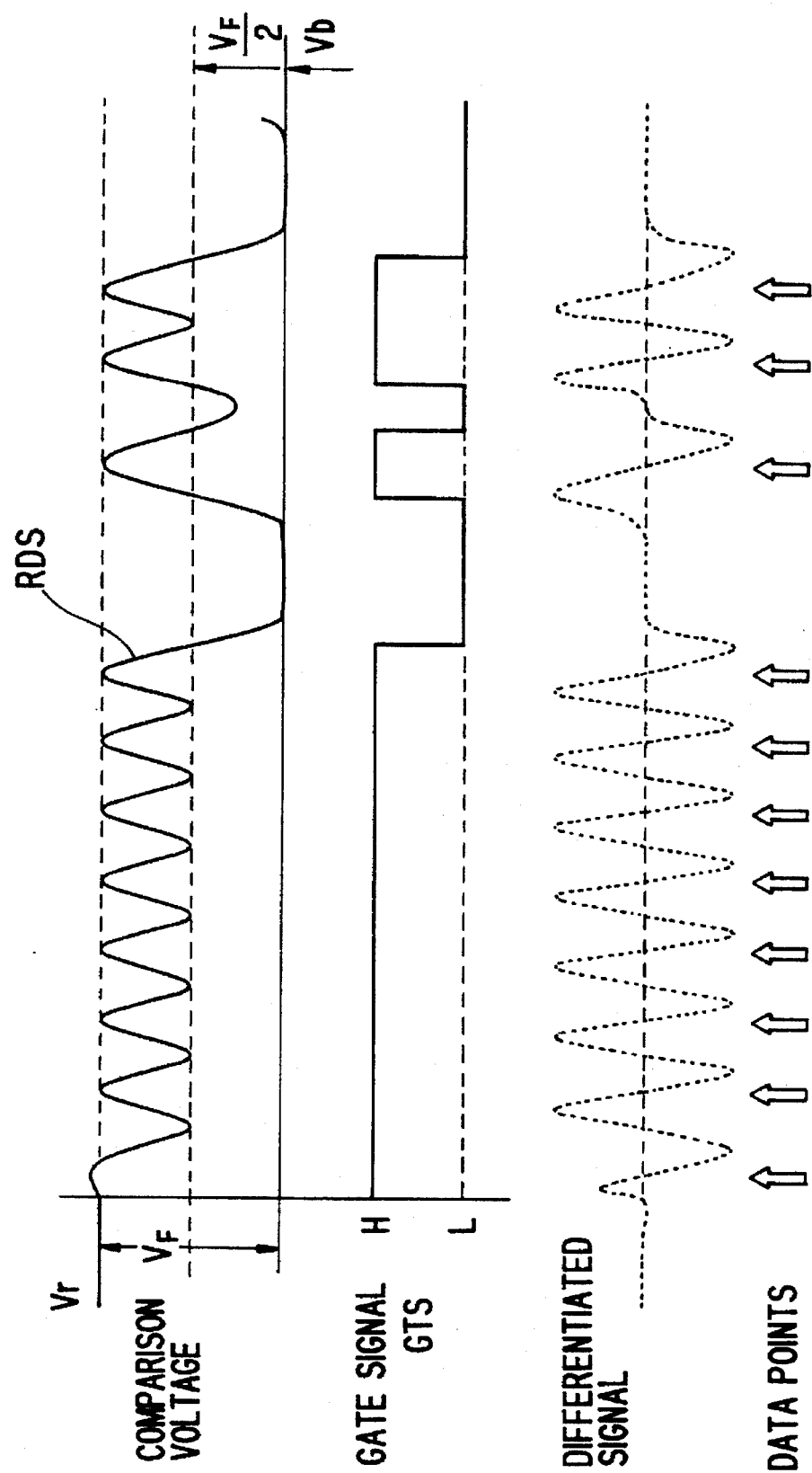
FIG. 10 is a waveform diagram for describing the operation of the modification.

The comparison potential of the clamped signal CLP in the gate signal generator 105 ideally is set to the amplitude of the reproduced signal at the time of the longest pattern, namely near 50% of the maximum amplitude. The reason for this is that the so-called level margin, which is for the purpose of preventing deterioration of the S/N ratio of the reproduced signal and output of an erroneous gate signal, attains its maximum value at the center of the reproduced signal. For this reason, $V_b + V_{rf}/2$ is applied to the inverting terminal of the comparator CMP. FIG. 10 is a signal waveform diagram of waveforms associated with FIG. 9.

Though reproduction of information in the MO area is described above, the present invention is applicable also to reproduction of information in a preformat area (ID area).

Further, though the foregoing relates to a case in which a Schottky diode is used, it is also possible to use a high-speed diode.

(C) Overview of second embodiment

Figure 11:
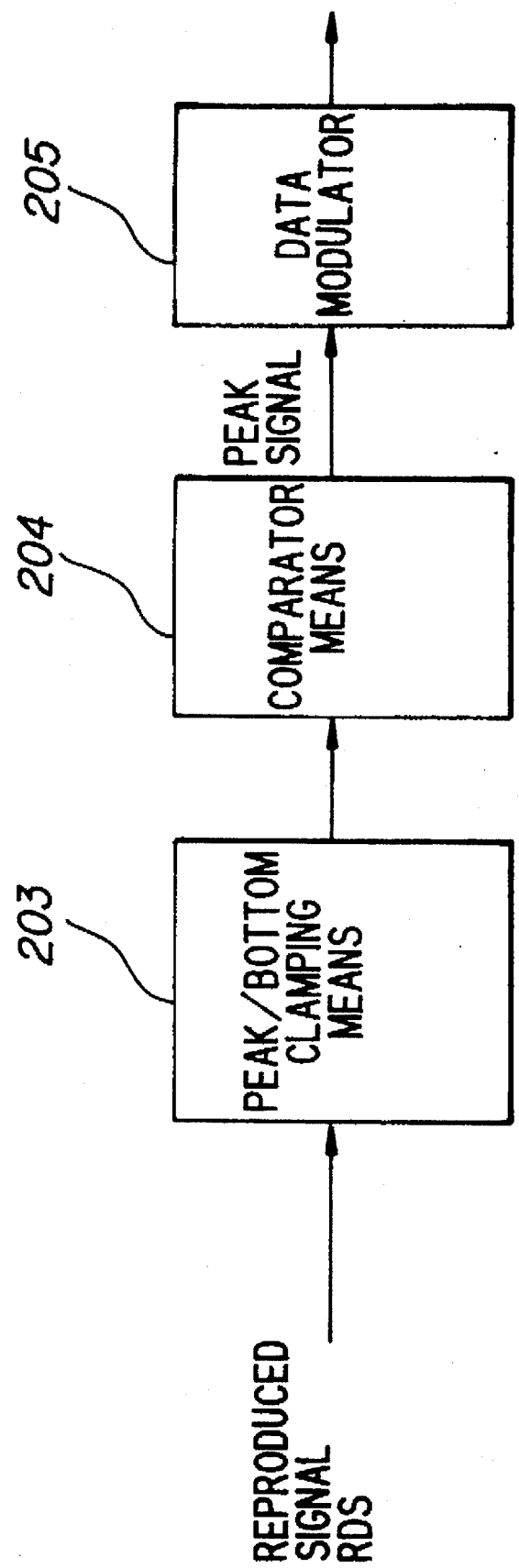
FIG. 11 is a block diagram for describing the general features of a second embodiment of the present invention.

FIG. 11 is a block diagram for describing the principles of a second embodiment of the present invention.

Numeral 203 denotes a clamping circuit for clamping the difference between the peak level and bottom level of the reproduced signal RDS, 204 a comparator circuit for discriminating a mark using the center of the amplitude of the clamped signal as a reference, and 205 a demodulator for demodulating data on the basis of a pulse signal conforming to the mark outputted by the comparator circuit 204.

In a case where data is demodulated from the reproduced signal RDS obtained by recording data by the absence or presence of marks and reading the marks from an optical disk on which the mark edges have been recorded as "1"s, the difference between the peak level and bottom level of the reproduced signal RDS is clamped at a prescribed value by the clamping circuit 203, marks are discriminated by the comparator circuit 204 using the center of the amplitude of the clamped signal as a reference, and data in which the mark edges are "1"s is demodulated by the demodulator 205 on the basis of pulse signals (mark signals) conforming to the marks outputted by the comparator circuit 204. If the difference between the peak level and bottom level of the reproduced signal is thus clamped at a prescribed level and marks are thus discriminated based upon the center of the amplitude of the clamped signal, the level of the amplitude center will not fluctuate and the timing at which the "1" data is discriminated will not deviate, thereby making accurate demodulation of the data possible.

Further, AGC control is applied. Specifically, a variable-gain amplifier and a gain control circuit for amplifying the reproduced signal and inputting the amplified signal to the clamping circuit are provided, and the gain of the variable-gain amplifier is controlled by generating a gain control voltage in such a manner that the signal amplitude outputted by the variable-gain amplifier will take on a constant value which is one to two times the clamp level when the frequency of the reproduced signal is maximum (which is when the amplitude of the reproduced signal is minimum). If this arrangement is adopted, the difference between the peak level and bottom level of the reproduced signal can be clamped at the prescribed level reliably, even if the amplitude of the reproduced signal is small, and therefore the center level of the difference can be held constant to make possible accurate demodulation of the data.

Furthermore, control of AGC is performed to control the gain of the variable-gain amplifier only when the gain control circuit reproduces data (the data pattern is always fixed) that has been recorded in the PLL draw-in area of the data field. If this expedient is adopted, gain control is carried out only at the time of a constant data pattern. As a result, accurate gain control can be performed and the difference between the peak level and bottom level of the reproduced signal can be clamped at the prescribed level reliably so that the center level can be held constant.

Further, if a reference voltage is generated using a diode whose characteristics are identical with those of the diodes constructing the clamping circuit and these diodes are thermally coupled, and if this reference voltage is then applied to the gain control circuit, the amplitude of the signal outputted by the variable-gain amplifier can be held at a constant value which is one to two times the clamp level.

Furthermore, by adding on an arrangement in which the reproduced signal is differentiated, a zero-cross signal is outputted when the differentiated signal crosses the zero level and the zero-cross signal is used to output a mark signal in which the mark center is "1", data in which the mark edge is "1" and data in which the mark center is "1" can be modulated.

(D) Second embodiment of the invention (a) Overall configuration

Figure 12:
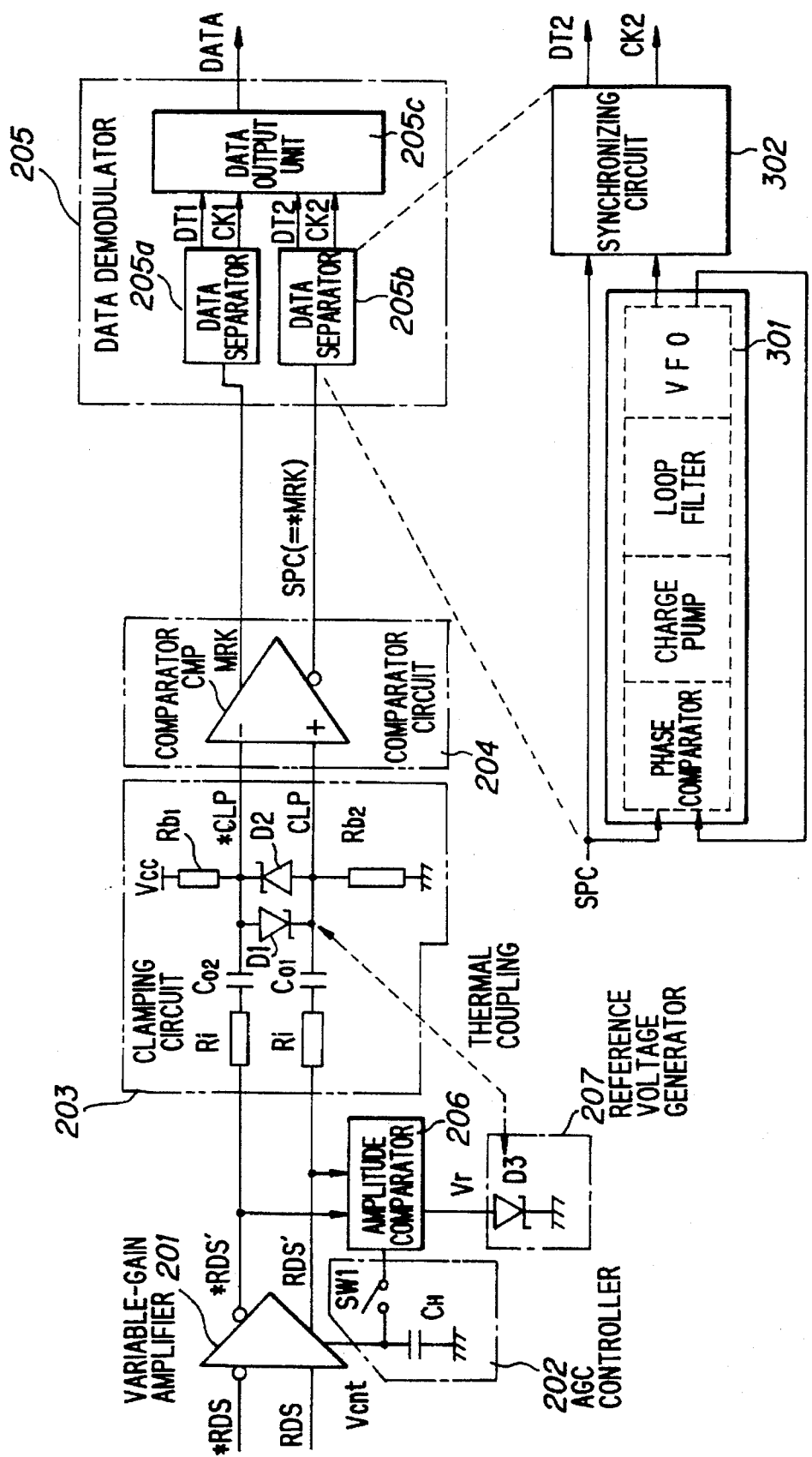
FIG. 12 is a diagram showing the construction of an embodiment of a data reproducing circuit according to the present invention.
Figure 13:
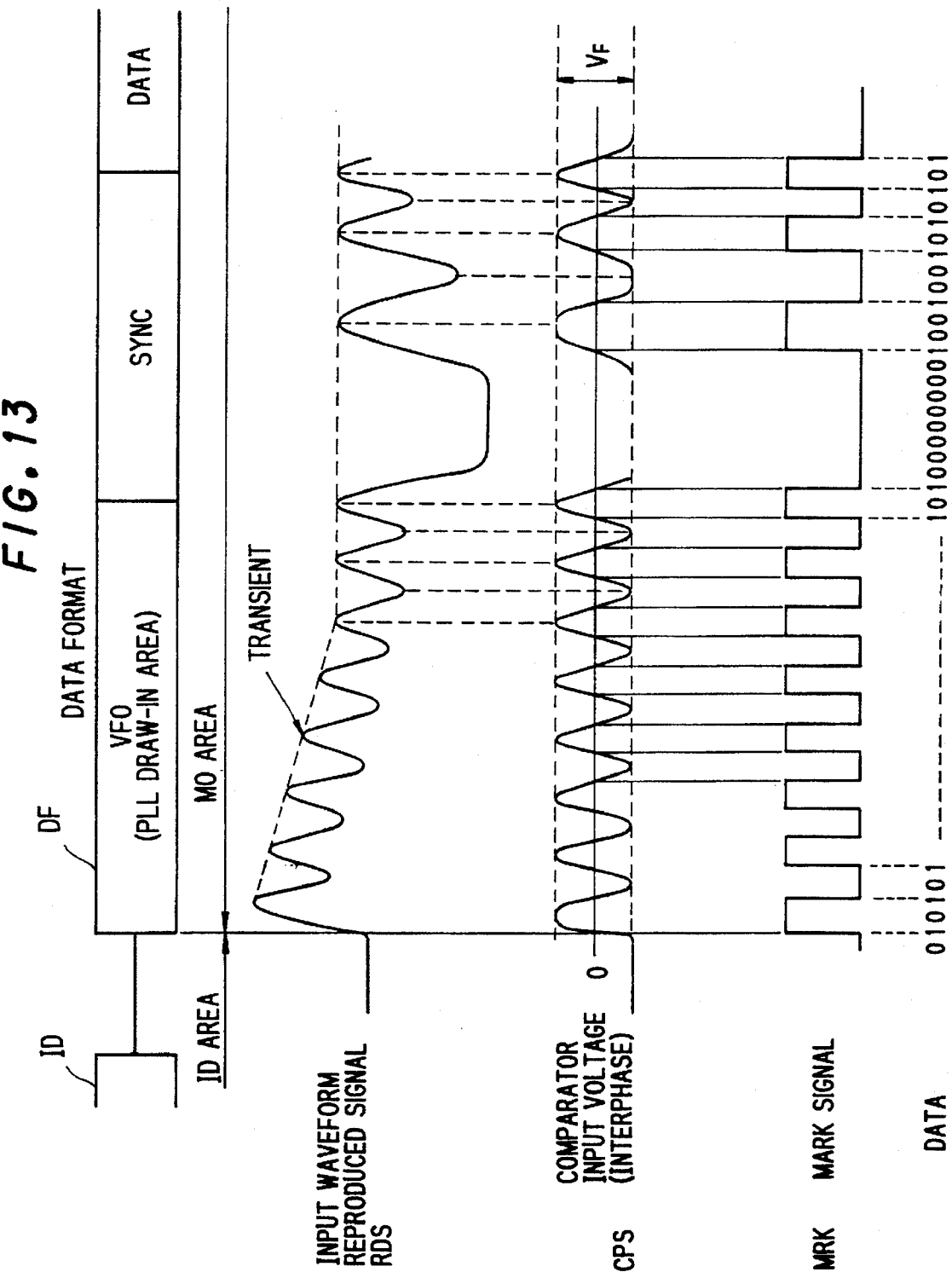
FIG. 13 is a waveform diagram of waveforms associated with various components.

FIG. 12 is a block diagram showing the construction of an embodiment of a data reproducing circuit according to the present invention in an optical disk drive, and FIG. 13 is a waveform diagram of the associated waveforms.

Here a variable-gain differential amplifier 201 amplifies the reproduced signal read from the optical disk. Reproduced signals RDS, *RDS of opposite polarity enter the amplifier 201, which outputs two signals (differential signals) of opposite polarity. It should be noted that the reproduced signals RDS, *RDS correspond to the signal RDS1, RDS2 [see FIG. 25C] outputted by the respective P-wave component detector $21_{11}$ and S-wave component detector $21_{12}$ of FIG. 24. An AGC control unit 202 amplifies the amplitudes of the differential signals RDS, *RDS to a prescribed value. The differential signals RDS, *RDS enter a clamping circuit 203, which clamps the peak and bottom of these signals to a prescribed value and outputs clamped signals CLP, *CLP, which are differential signals. Since the peak level and bottom level of the clamped signals CLP, *CLP are clamped at a prescribed value, the difference between them also is clamped at a fixed level (referred to as the "clamp level").

A comparator circuit 204 is constituted by a comparator element CMP. The clamped signals CLP, *CLP enter the non-inverting terminal (+) and inverting terminal (−), respectively, of the comparator circuit, which outputs a high-level mark signal MRK and a low-level space signal SPC (a signal which is the inverse of the mark signal MRK) when the signal CLP is at a level higher than that of the other signal *CLP, and a low-level mark signal MRK and high-level space signal SPC when the opposite is the case. In other words, the comparator circuit 204 outputs the high-level mark signal MRK when the difference voltage (interphase voltage) between the clamped signals CLP, *CLP is greater than an intermediate level (0 level), and outputs the high-level space signal SPC when the difference voltage is less than the intermediate level. A demodulator 205 demodulates data of margin edge "1" on the basis of the mark signal MRK and space signal SPC outputted by the comparator circuit.

An amplitude comparator 206 compares the differential signals *RDS', RDS' outputted by the variable-gain amplifier 201 with a reference voltage level Vr and applies the amplitude difference to the AGC control unit 202. A reference voltage generator 207 generates the reference voltage Vr. The AGC control unit 202, amplitude comparator 206 and reference voltage generator 207 construct a feedback system whereby feedback control is performed in such a manner that the difference voltage between the differential signals RDS', *RDS' outputted by the variable-gain amplifier 201 becomes a constant value (the reference voltage value Vr) which is one to two times the clamp level.

This feedback system turns on a switch SW1 when data that has been recorded in the PLL draw-in area VFO of the data field is reproduced, whereby gain control is performed in such a manner that the signal amplitude outputted by the variable-gain amplifier 201 becomes a constant value (the reference voltage value Vr) which is one to two times the clamp level. Further, the gain control voltage Vcnt obtained is held in a capacitor $C_H$. When the switch SW1 is subsequently turned off and data that has been recorded in another user area of the data field is reproduced, the gain of the amplifier 201 is controlled so as to be constant by the gain control voltage Vcnt held in the capacitor.

The reason for performing feedback control only in the PLL draw-in area VFO is that although the amplitude of the reproduced signal fluctuates depending upon the data pattern, the data pattern is constant in the draw-in area VFO, thus enabling accurate gain control. In FIG. 13, RDS represents the waveform of the reproduced signal, CPS the waveform of the interphase voltage signal between the non-inverting terminal and inverting terminal of the comparator circuit 204, and MRK the waveform of the mark signal. Though the waveform of the reproduced signal *RDS is not shown, this signal would have a waveform obtained by reversing the polarity of the reproduced signal RDS. The waveform of the space signal SPC also is not shown, but this signal would have a waveform obtained by reversing the polarity of the mark signal MRK. The interphase voltage signal CPS is the difference signal between the clamped signal CLP and the clamped signal *CLP.

(b) Construction of each unit

Clamping circuit

As depicted in FIG. 12, the clamping circuit 203 comprises two capacitors $C_{O1}$, $C_{O2}$ for cutting DC components of the reproduced signals RDS', *RDS', two current-limiting resistors $R_i$ connected in series with the capacitors $C_{O1}$, $C_{O2}$, biasing resistors $Rb_1$, $Rb_2$, a biasing voltage $V_{cc}$ and diodes $D_1$, $D_2$ in mutually opposing directions. The diodes $D_1$, $D_2$ are biased in forward and reverse directions, respectively, via the biasing resistors, and the ends of the diode pair are connected to the non-inverting and inverting terminals of the comparator constructing the comparator circuit 204. Though junction-type (PN) diodes may be used as the diodes, Schottky barrier diodes are preferred in view of their high speed. More specifically, since a Schottky diode theoretically is entirely unaffected by accumulated electric charge, the signal delay is negligible in comparison with a clamping circuit using a transistor or another type of diode. Further, since the Schottky diode takes on a fixed value $V_F$ irrespective of the applied voltage, it is possible to achieve clamping at a fixed potential at all times.

When the reproduced signal RDS' enters, the input signal is applied to the non-inverting terminal (+) of the comparator element CMP as is until the RDS' attains the conduction voltage $V_F$ of the diode $D_2$. When the reproduced signal RDS' grows larger and exceeds $V_F$, the diode D2 conducts and the interphase voltage of the input terminals is clamped at $V_F$. The resulting current is charged in the capacitor $C_{O1}$. When the reproduced signal RDS' stops increasing and starts decreasing under these conditions, the capacitor $C_{O1}$ begins discharging, as a result of which the diode $D_2$ is rendered non-conductive and the input voltage of the comparator CMP decreases. As this operation progresses, the input of the comparator CMP eventually reverses polarity. When the clamp level $V_F$ is reached, the diode $D_1$ is rendered conductive and the capacitor $C_{O2}$ is charged through a process similar to that described above. The above-described operation is repeated to clamp the peak and bottom of the reproduced signal at the prescribed values so that the difference between them (the interphase voltage) can be clamped at the conduction voltage $V_F$ of the diodes.

The current-limiting resistors Ri connected in series with the capacitors act to limit the current which flows when the diodes are rendered conductive. The biasing resistors $Rb_1$, $Rb_2$ fix the voltage in the absence of a signal and apply a time constant in cooperation with the capacitors $C_{O1}$, $C_{O2}$. The time constant is the longest bit interval (the interval from one "1" bit to the next "1" bit) of the input signal and is less than the interval of the PLL draw-in area at the head of the recorded data field.

Data demodulator

Figure 14:
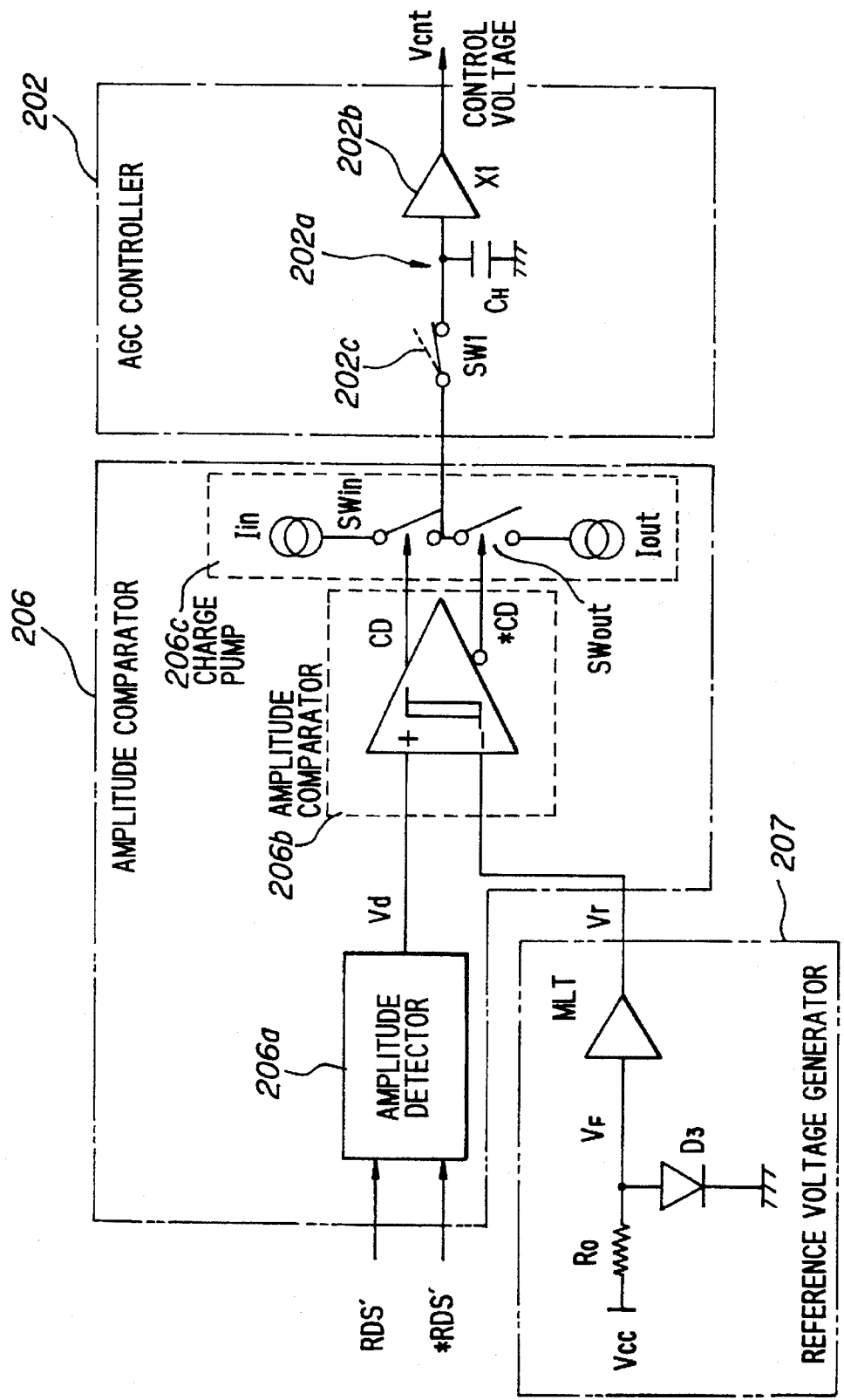
FIG. 14 is a diagram showing the construction of a feedback system.

The data demodulator 205 has data separators 205a, 205b and a data output unit 205c. The mark signal MRK enters the data separator 205a, which reproduces a clock signal CK1 from the mark signal and outputs data DT1 at logical "1" at the leading edge of the mark signal MRK. The space signal SPC enters the data separator 205b, which reproduces a clock signal CK2 from the space signal and outputs data DT2 at the leading edge of the space signal SPC. The data output unit 205c combines the data DT1, DT2 and outputs data DATA. The data separators 205a, 205b are identical in construction and each includes a PLL circuit 301 and a synchronizing circuit 302. The data output unit 205c accepts the data DT1, DT2 alternately from the data separators 205a, 205b in synch with the clock signals CK1, CK2, combines the data and effects a conversion to parallel data DATA of a prescribed bit length. This data is outputted Construction of feedback system FIG. 14 is a diagram showing the construction of the feedback system which controls the gain of the variable-gain amplifier 201. The feedback system includes the amplitude comparator 206 for outputting the voltage difference between the amplitude voltage Vd of the differential signals RDS', *RDS' outputted by the variable-gain amplifier 201 and the reference voltage level Vr, the AGC control unit 202 for generating the control voltage signal Vcnt conforming to the voltage difference, and the reference voltage generator 207 for generating the reference voltage $V_r$, which n (=1~2) times the conduction voltage (forward-voltage drop) $V_F$ of the Schottky barrier diodes $D_1$, $D_2$ constructing the clamping circuit 203.

Figure 15:
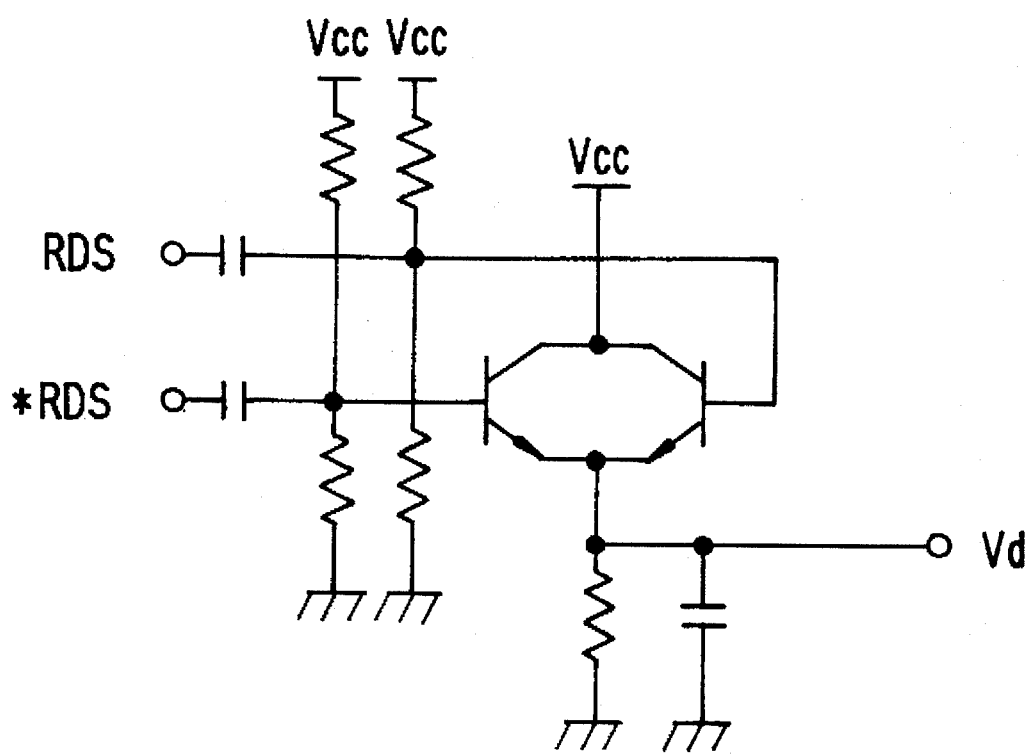
FIG. 15 is a diagram showing the construction of an amplitude detector.

The amplitude comparator 206 includes an amplitude detector 206a for detecting the signal amplitudes of the differential signals RDS', *RDS'. The amplitude comparator 206 is constituted by a differential amplifier, as illustrated in FIG. 15. The comparator 206 further includes an amplitude comparator element 206b for comparing the reference voltage Vr and the amplitude voltage Vd, and a charge pump 206c comprising constant-current sources Iin, Iout and switches SWin, SWout. The charge pump 206c sucks in and expels charge by turning the switches SWin, SWout on and off on the basis of the output from the amplitude comparator element 206b.

The AGC control unit 202 includes a low-pass filter 202a having a capacitor CH for converting the current output of the charge pump to voltage, a buffer amplifier 202b for delivering the output of the low-pass filter as the control voltage signal Vcnt, and a switch (SW1) 202c. The switch 202c turns on to apply feedback control only in the PLL draw-in area VFO and turns off in the following user area to make the gain constant by virtue of the control voltage Vcnt held in the capacitor $C_H$.

The reference voltage generator 207 has a Schottky barrier diode D3 whose characteristics are identical with those of the Schottky barrier diodes $D_1$, $D_2$ of the clamping circuit 203, a biasing resistor $R_0$ for biasing the diode in the forward direction, and a multiplier (e.g., an amplifier) MLT for multiplying the conduction voltage $V_F$ of the Schottky diode $D_3$ by n (=1~2). More specifically, the reference voltage generator 207 outputs, as the reference voltage $V_r$ (=n·$V_F$), the product of n and the conduction voltage (clamp voltage) $V_F$ of the Schottky barrier diode.

An advantage of a Schottky barrier diode is high speed but a disadvantage is a large variation in characteristics caused by a change in temperature. Accordingly, the Schottky diode $D_3$ is mounted adjacent the Schottky barrier diodes $D_1$, $D_2$ of the clamping circuit 203 or is fabricated on the same chip, thereby achieving thermal coupling with the diodes D1, D2 so that the diodes $D_1$, $D_2$ and $D_3$ will be used under the same conditions.

Operation

At the time of data reproduction in the PLL draw-in area, the switch (SW1) 202c is turned on to perform feedback control. In accordance with this feedback control, the reference voltage generator 207 applies the reference voltage $V_r$ (=n·$V_F$) to the minus terminal of the comparator 206b. Meanwhile, the amplitude detector 206a computes the amplitude voltage Vd between the differential signals RDS', *RDS' and inputs $V_d$ to the plus terminal of the comparator 206b.

The comparator 206b compares the amplitudes of the two inputs, outputs the low-level drive signal CD if the amplitude voltage $V_d$ is less than the reference voltage $V_r$ (=n·$V_F$) and outputs the high-level drive signal CD if $V_d$ is greater than $V_r$ (=n·$V_F$).

In a case where the drive signal CS is at the low level (CD="0", *CD="1"), the switch SWout turns on so that the electric charge that has accumulated in the capacitor $C_H$ is discharged. Conversely, in a case where the drive signal CS is at the high level, the switch SWin turns on so that electric charge is charged in the capacitor $C_H$. As a result, the low-pass filter 202a outputs the voltage control signal Vcnt, which increases and decreases in dependence upon the value of the amplitude voltage $V_d$. In a case where the control voltage signal Vcnt is small, the gain of the variable-gain amplifier 201 rises and the amplitude voltage $V_d$ increases, as will be described later. In a case where the control voltage signal Vcnt is large, the gain of the variable-gain amplifier 201 declines and the amplitude voltage $V_d$ decreases. As a result, the amplitude voltage becomes a fixed value which is n (=1 ~2) times the clamp voltage.

When reproduction of data in the PLL draw-in area ends, the switch (SW1) 202c is turned off, after which the gain of the variable-gain amplifier 201 is controlled to be constant by the control voltage Vcnt held in the capacitor $C_H$.

In a case where there are differentiated signals of the differential signals RDS', *RDS', these differentiated outputs can be applied to the amplitude comparator 206 as inputs thereto.

Variable-Gain amplifier

Figure 16:
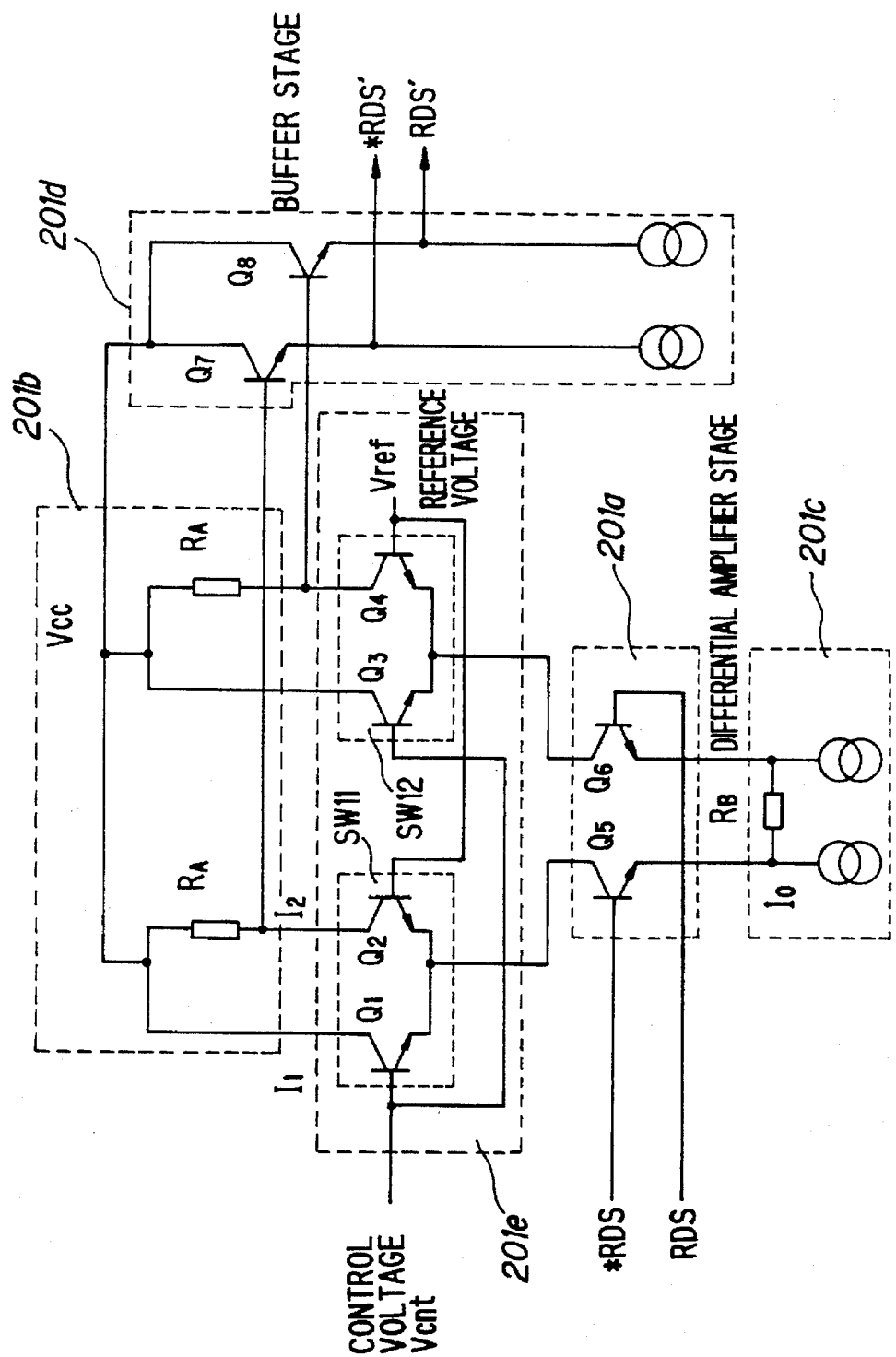
FIG. 16 is a diagram showing the construction of a variable-gain amplifier.

FIG. 16 is a diagram showing the construction of the variable-gain amplifier. The arrangement of FIG. 16 is referred to as a Gilbert cell and is already finding use in many circuits. The variable-gain amplifier 201 includes a differential amplifier 201a having transistors $Q_5$, $Q_6$ whose inputs are the reproduced signals RDS, *RDS of different polarity, a biasing unit 201b which supplies current to each of the transistors of amplifier 201a, a constant-current unit 201c, an output buffer 201d and a transistor switch 201e.

The transistor switch 201e has two sets of transistor switches SW11 ($Q_1$, $Q_2$) and SW12 ($Q_3$, $Q_4$) for controlling the gain of the differential amplifier 201a in dependence upon the magnitudes of the control voltage signal Vcnt outputted by the AGC control unit 202 and the preset reference voltage Vref. The transistor switch 201e compares the control voltage signal Vcnt and the reference voltage Vref, and controls the conductivity of the transistors $Q_1$~$Q_4$ in such a manner that the reference voltage and control voltage become equal, thereby controlling the gain of the differential amplifier 201a so that the amplitudes of the reproduced signals RDS', *RDS' are made the optimum value.

The principle of operation will now be described in brief. The differential input signals (reproduced signals) DS1, *RDS enter the respective transistors $Q_5$, $Q_6$ of the differential amplifier 201a. The transistor switches SW11, SW12 constructed by the transistors $Q_1$, $Q_2$ and $Q_3$, $Q_4$, respectively, are connected to the loads of the transistors. The control voltage signal Vcnt is applied to the base of one transistor in each switch, and the reference voltage signal Vref is applied to the base of the other transistor in each switch. In a case where the inequality (reference voltage Vref)>(control voltage signal Vcnt) holds, the transistors $Q_2$, $Q_4$ turn on and the transistors $Q_1$, $Q_3$ turn off. As a result, the reproduced signals RDS, *RDS appear at load resistors $R_A$ of the transistors $Q_2$, $Q_4$ and become input signals *RDS', RDS' of the clamping circuit 203 via transistors $Q_7$, $Q_8$ of the buffer 201d. Maximum gain is attained at this time and the voltage gain is $R_A/R_B$.

In a case where the inequality (reference voltage Vref)< (control voltage signal Vcnt) holds, the transistors $Q_1$, $Q_3$ turn on and the transistors $Q_2$, $Q_4$ turn off. As a result, the reproduced signals *RDS, RDS do not appear at all at the load resistors $R_A$ and the gain becomes zero. In actuality, control is performed by a feedback loop in such a manner that the relation (reference voltage Vref)≈(control voltage signal Vcnt) is established. As a result, the amplitude of the outputs signal *RDS', RDS' is the product of multiplying the clamp level $V_F$ by n (=1~2).

(c) Overall operation

The variable-gain amplifier 201 differentially amplifies and outputs the reproduced signals RDS, *RDS. When the variable-gain amplifier 201 outputs the differential signals RDS', *RDS', the feedback system (202, 206, 207) performs gain control so that the amplitudes of the differential signals RDS', *RDS' become n·$V_F$. The clamping circuit 203 clamps the peak and bottom of the differential signals RDS', *RDS', which have been outputted by the variable-gain amplifier 201 subjected to gain control, at the fixed values and applies the clamped signals CLP, *CLP, which are differential signals, to the comparator circuit 204. It should be noted that the amplitude of the interphase voltage signal CPS (see FIG. 13), which is the difference between the clamped signals CLP, CLP', is clamped at the conduction voltage $V_F$ of the Schottky barrier diode.

When the interphase voltage is greater than the intermediate level, i.e., when the clamped signal CLP is at a level higher than that of the other clamped signal *CLP, the comparator circuit 204 sends the mark signal MRK to the high level and the space signal SPC to the low level. When the clamped signal CLP is at a level lower than that of the other clamped signal *CLP, the comparator circuit 204 sends the mark signal MRK to the low level and the space signal SPC to the high level.

On the basis of the mark signal MRK and space signal SPC from the comparator circuit 204, the demodulator 205 demodulates the data DATA, in which mark edge is taken as being logical "1", and outputs the result.

(E) Third embodiment

Figure 17:
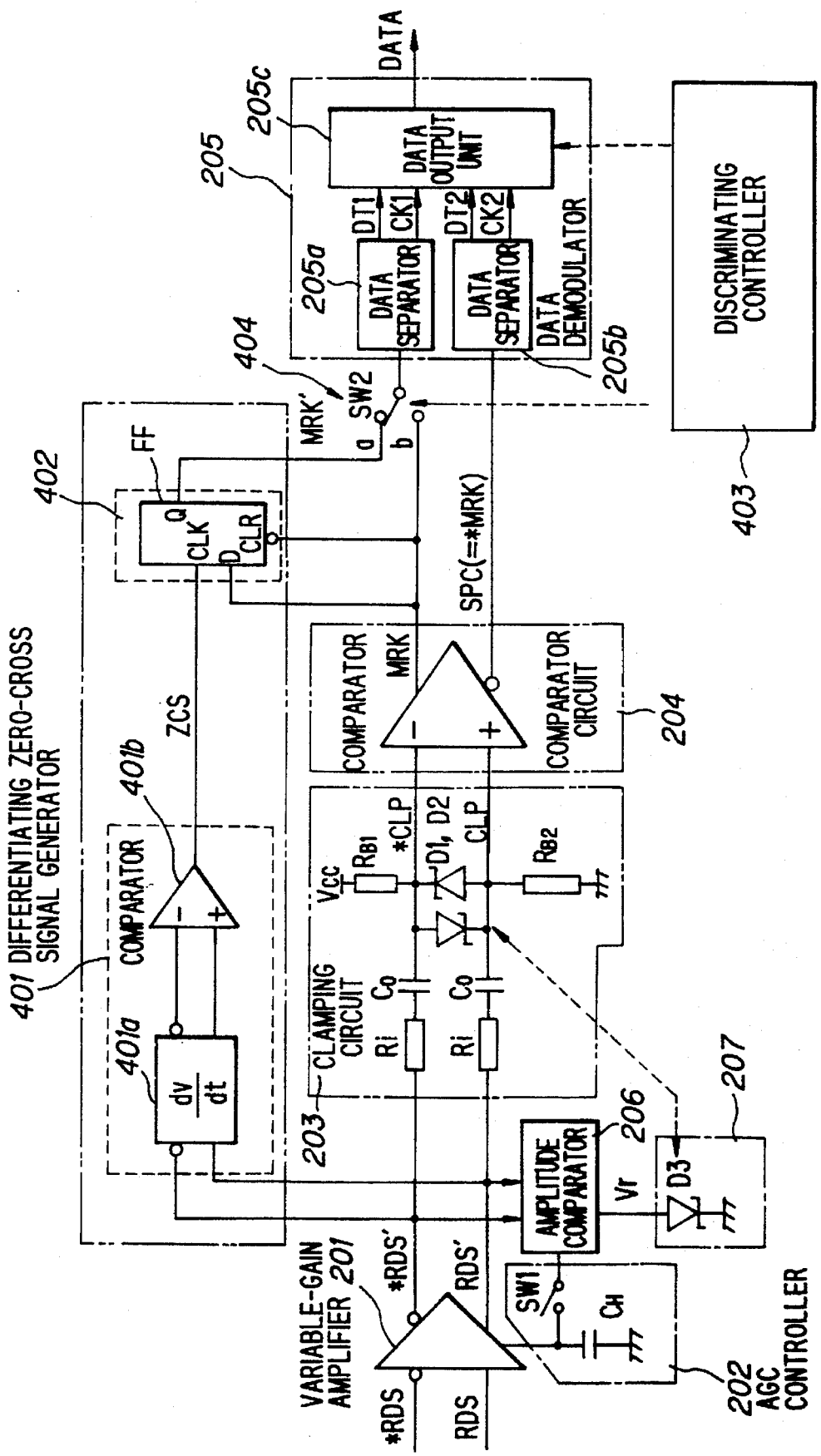
FIG. 17 is a diagram showing the construction of another embodiment of a data reproducing circuit according to the present invention.

FIG. 17 illustrates an embodiment in which reproduction can be performed not only by the mark-edge detection method in which mark edge is taken as being "1" but also in the peak-point detection method according to the prior art in which the center of a mark is taken as being "1". Components identical with those of the second embodiment shown in FIG. 12 are designated by like reference characters.

Numeral 401 denotes a differentiating zero-cross signal generator, 402 a data pulse signal output unit for outputting a data pulse signal (second mark signal) MRK' in a second recording method, and 403 a discriminating controller for judging whether a method for recording on an optical disk is the mark-edge detection method in which mark edge is taken as being "1" or the peak-point detection method in which the center of a mark is taken as being "1". Further, numeral 404 denotes a switch (SW2) for inputting the second mark signal MRK' to the data demodulator 205 in response to a command from the discriminating controller 403. The discriminating controller 403 notifies the data output unit 205c of the recording method, such as RLL (1,7) or RLL (2,7), and changes over the position of a variable contact of the switch 404 to an a contact of a b contact on the basis of whether the detection method is the mark-edge detection method or the peak-point detection method. Since the distinction between the recording methods and the distinction between the detection methods is contained in the format information recorded in the control zone of the optical disk, the particular method can be distinguished by reproducing this format information.

The differentiating zero-cross signal generator 401 has a differentiating circuit 401a and a comparator 401b. The differentiating circuit 401a differentiates each of the differential signals (reproduced signals) RDS', *RDS outputted by the variable-gain amplifier 201, and the comparator 401b, to which the differentiated signals are applied, outputs a high-level zero-cross signal ZCS when the signal indicating the difference between these two inputs falls below zero level.

The second mark signal output unit 402 is constituted by a flip-flop FF. The zero-cross signal ZCS is applied to the clock terminal CLK of the flip-flop FF, the first mark signal MRK outputted by the comparator circuit 204 is applied to the data terminal D of the flip-flop FF, a signal obtained by inverting the first mark signal MRK is applied to the clear terminal CLR of the flip-flop, and the second mark signal MRK' is outputted from the Q terminal of the flip-flop. The flip-flop FF is set when the zero-cross signal ZCS is generated while the first mark signal MRK is being produced. The flip-flop is reset when the first mark signal MRK assumes the low level. As a result, the second mark signal output unit 402 outputs the second mark signal MRK', which attains the high level at the peak point of the reproduced signal RDS.

The discriminating controller 403 changes over the position of the movable contact of switch 404 based upon the detection method identified by the format information. For example, in case of the mark-edge detection method, the movable contact of switch 404 is changed over to the b contact so that the demodulator 205 outputs data in which mark edge is taken as being "1". In the case of the peak-point detection method, the movable contact of switch 404 is changed over to the a contact so that the demodulator 205 outputs data in which mark center is taken as being "1".

(F) Fourth embodiment

Figure 18:
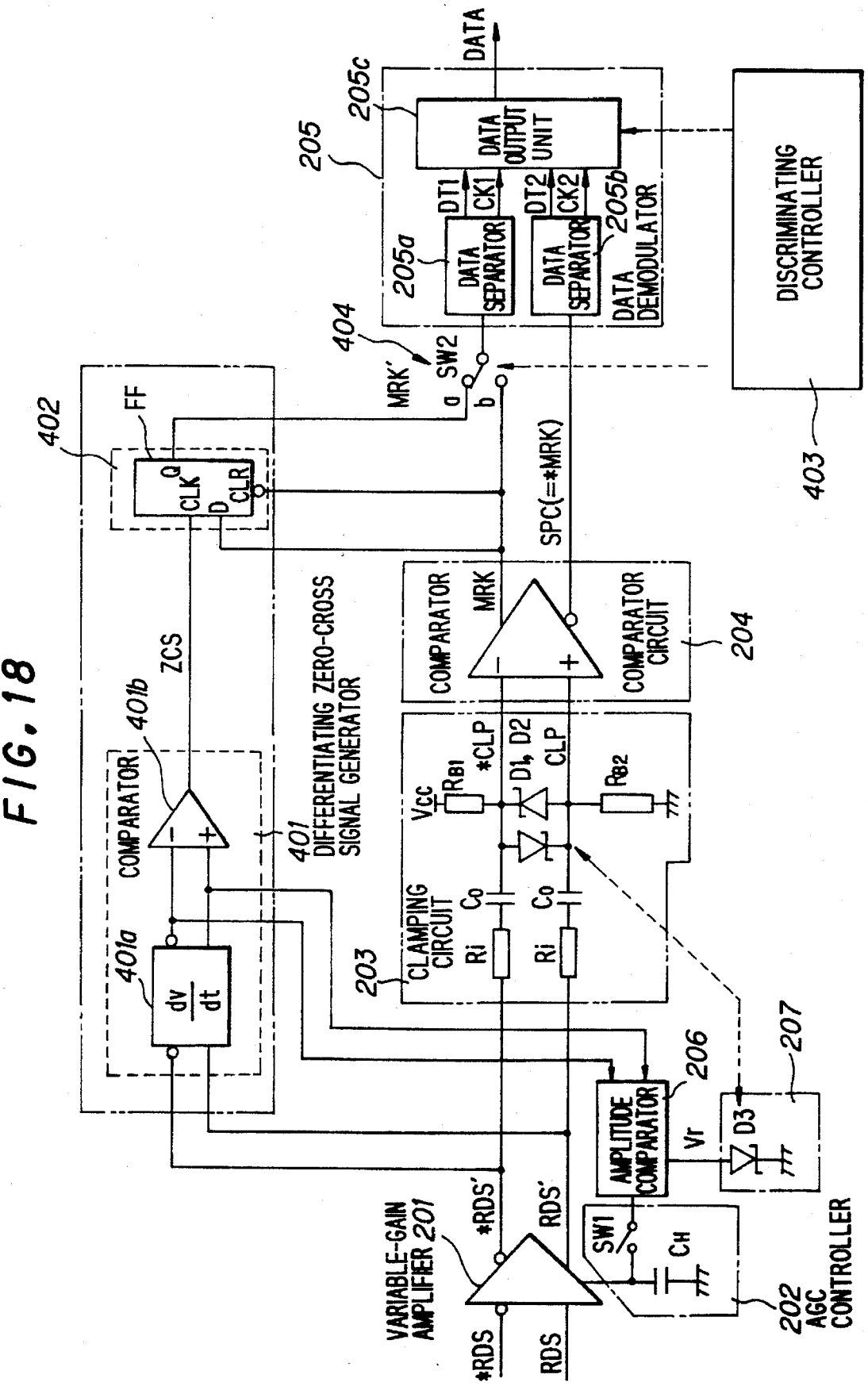
FIG. 18 is a diagram showing the construction of still another embodiment of a data reproducing circuit according to the present invention.

FIG. 18 is a diagram illustrating a fourth embodiment of the present invention. Components identical with those of the third embodiment shown in FIG. 17 are designated by like reference characters. This embodiment differs from the third embodiment in that signals obtained by differentiating the differential signals (reproduced signals) RDS', *RDS' are fed into the amplitude comparator 206.

In the arrangement of the third embodiment in which the differential signals RDS', *RDS' are applied to the amplitude comparator 206, a transient component remains in the differential signals RDS', *RDS'. A problem which arises as a consequence is that AGC cannot be performed accurately. However, in the arrangement of the fourth embodiment in which the signals obtained by differentiating the differential signals RDS', *RDS' are applied to the amplitude comparator 206, the low and high amplitudes of the differentiated signals are stable (nearly constant), thus enabling accurate AGC. The fourth embodiment is ideal for a case in which gain control is performed by the pattern of the PLL draw-in area VFO without relying upon the data pattern.

The fourth embodiment is arranged so that reproduction can be performed with the peak-point detection method as well as the mark-edge detection method. However, it is simple to modify this arrangement to a reproduction circuit using solely the peak-point detection method. If the discriminating controller 403, switch 404 and data separator 205b are removed from the arrangement of FIG. 18 and the Q output of the flip-flop FF is connected to the data separator 205a, the circuit becomes a reproduction circuit using the peak-point detection method.

Figure 19:
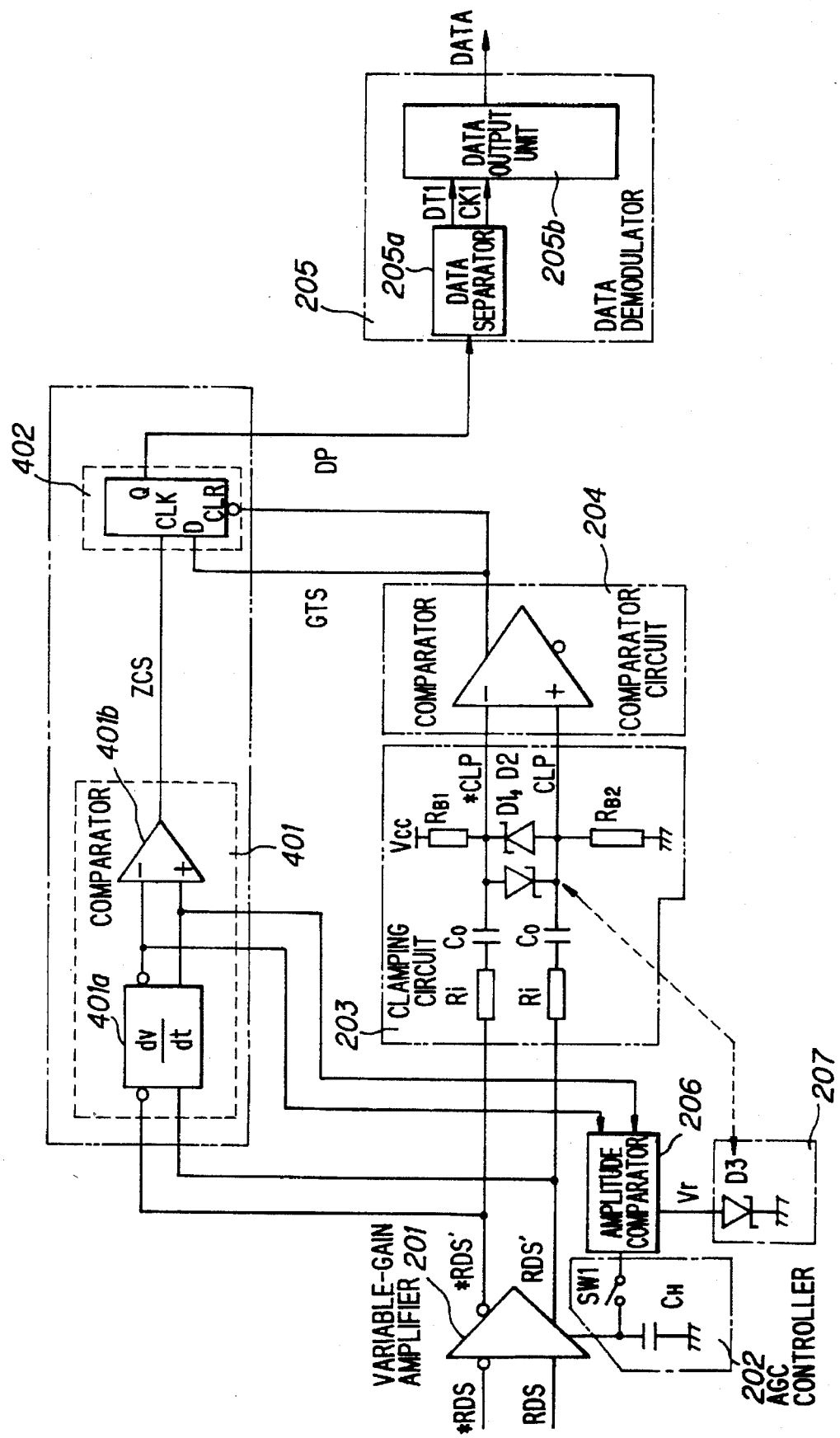
FIG. 19 is a diagram showing the construction of a reproducing circuit of peak-point detecting type.
Figure 20A:
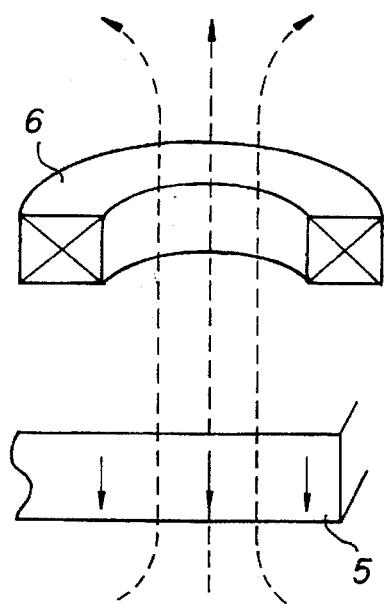
FIG. 20A–FIG. 20D are diagrams for describing writing/reading of a conventional magneto-optical disk.
Figure 20B:
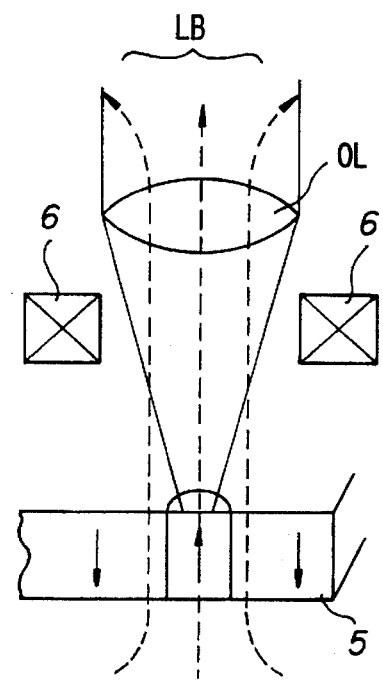
Figure 20C:
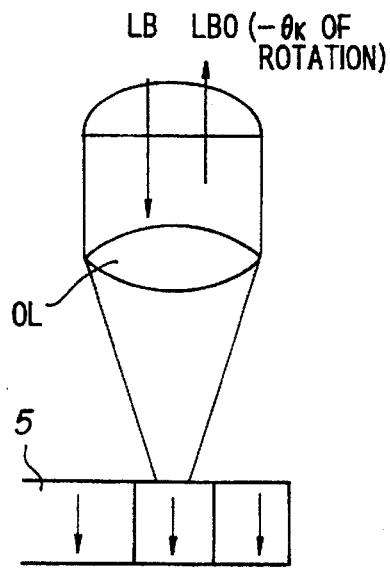
Figure 20D:
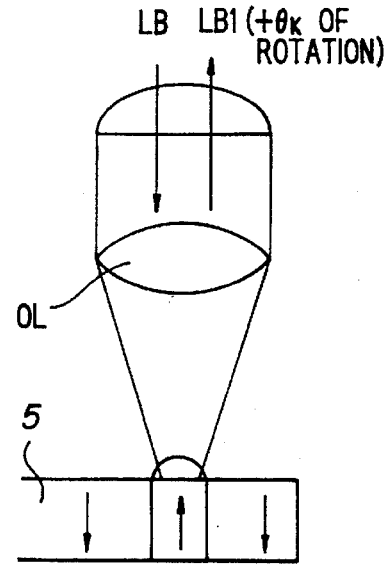
Figure 21A:
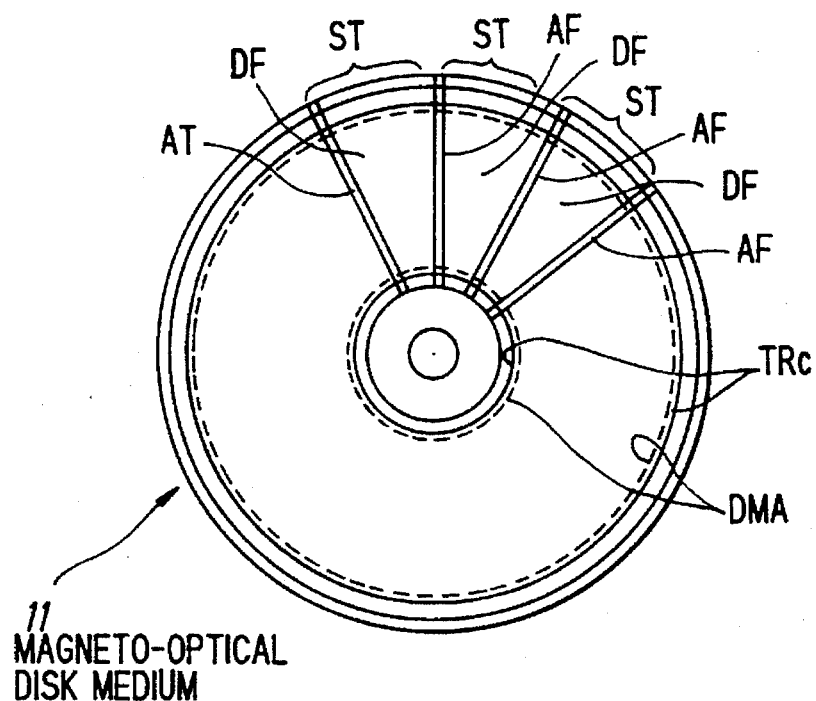
FIG. 21A, FIG. 21B are diagrams showing the construction of a conventional magneto-optical medium.
Figure 21B:
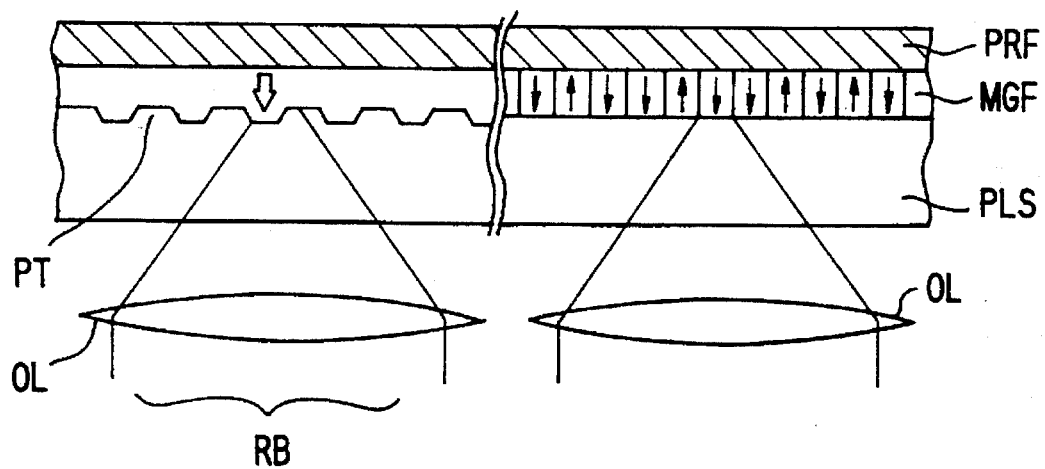
Figure 22:
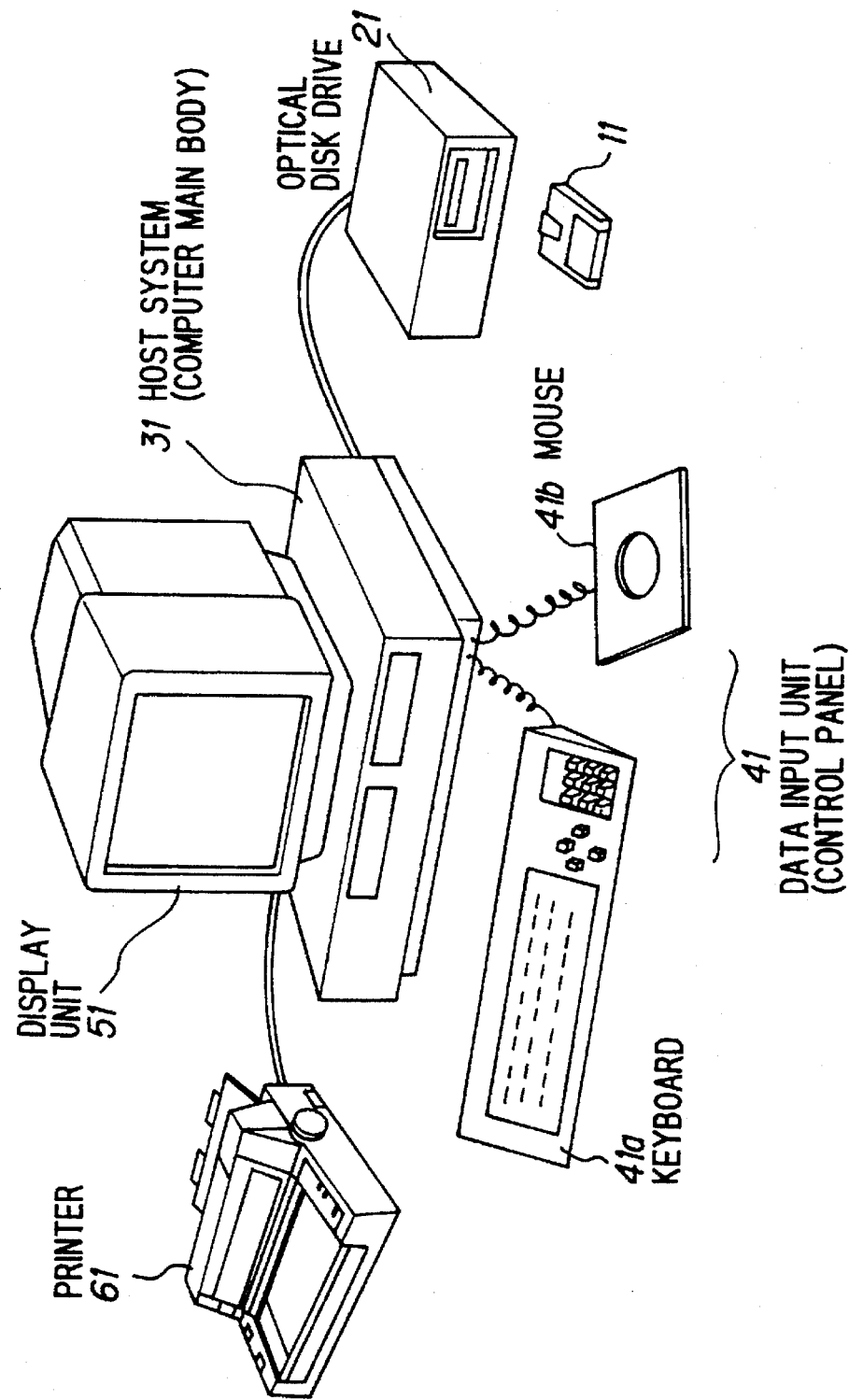
FIG. 22 is a diagram showing system configuration according to the prior art.
Figure 23:
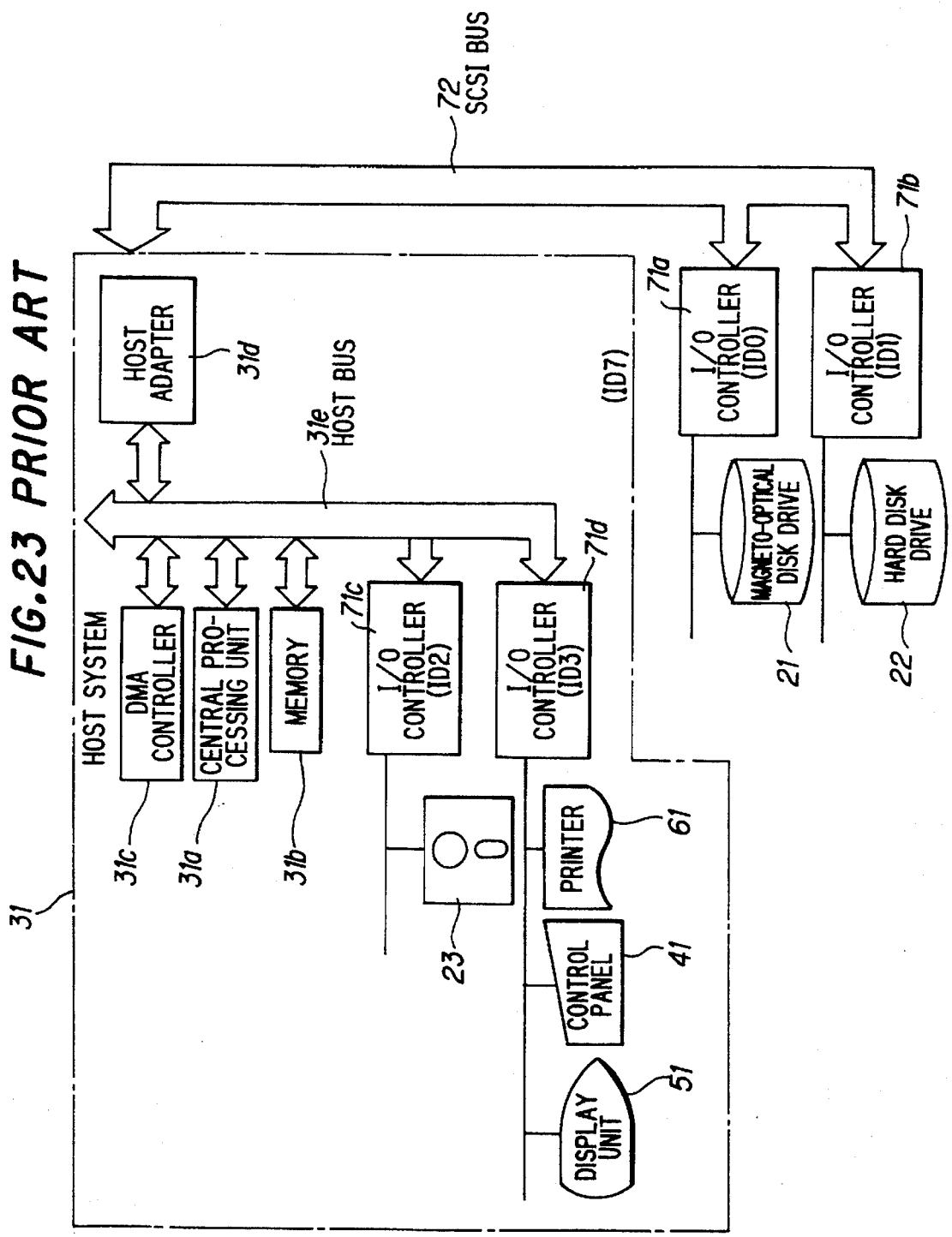
FIG. 23 is a diagram showing the electrical construction of the system according to the prior art.

FIG. 19 is a diagram showing such a reproduction circuit using the peak-point detection method. The circuit comprises the variable-gain amplifier 201 for amplifying the reproduced signals RDS, *RDS and inputting the amplified signals to the clamping circuit 203, which is for clamping the difference between the peak level and bottom level of the reproduced signals, the comparator circuit 204 for discriminating a mark using the center of the amplitude of the clamped signal as a reference and then outputting the gate signal GTS conforming to the mark, the differentiating zero-cross signal generator 401 for differentiating the reproduced signal and outputting the zero-cross signal ZCS when the differentiated signal crosses the zero level, the data-pulse output unit 402 for outputting the data pulse DP when the zero-cross signal ZCS is generated while the gate signal GTS is being produced, the demodulator 205 for demodulating the data DATA from the data pulse DP, the reference voltage generator 207 for generating the reference voltage Vr, which is one to two times the clamp level, the amplitude comparator 206 for comparing the reference voltage and the signal amplitude of the differentiated signal ZCS, and the gain control circuit 202 which, on the basis of the results of comparison from the amplitude comparator, generates the gain control voltage in such a manner that the signal amplitude outputted by the variable-gain amplifier attains a prescribed value which is one to two times the clamp level, thereby controlling the gain of the variable-gain amplifier.

Thus, in accordance with the present invention, the peak of a reproduced signal is clamped at a prescribed potential in a clamping circuit and a gate signal is generated based upon this constant peak value. As a result, the gate signal can be generated accurately even if the peak value fluctuates. Further, even in a case where resolution declines owing to an increase in density or a change in recording conditions, or even if there is a transient component or envelope fluctuation, data can be read accurately.

Further, in accordance with the present invention, it is so arranged that peak value is clamped at a constant potential. As a result, slice level for gate-signal creation can be set high, noise caused by flaws is not read mistakenly and, hence, the influence of flaws can be eliminated.

Further, in accordance with the present invention, the clamping circuit is constructed using Schottky diode and AGC control is performed in such a manner that the reference voltage level in an amplitude comparator becomes 1.1~1.7 times the forward voltage of the Schottky diode. As a result, the margin of the apparatus can be enlarged by automatically setting the amplitude of the clamped signal to an optimum value by an AGC operation even if the amplitude of the reproduced signal fluctuates owing to the medium characteristics or variance from one drive to another. Further, even if the characteristic (forward-voltage drop) of the diodes fluctuates owing to environmental temperature or junction-surface temperature, the amplitude of the clamped signal can be optimized by AGC to enlarge the margin of the apparatus. Furthermore, since Schottky diodes are not affected by accumulated electric charge, the peak value of the reproduced signal is not delayed and high-speed clamping can be performed. This makes it possible to deal with high density and high-speed transfer.

Furthermore, according to the present invention, the difference between the peak level and bottom level of the reproduced signal is clamped at a prescribed level and marks are discriminated based upon the center of the amplitude of the clamped signal. As a result, there is no fluctuation in the amplitude center level and no shift in the timing at which data "1" is discriminated. This makes it possible to demodulate data correctly.

Further, in accordance with the invention, when the frequency of a reproduced signal is maximum (i.e., when the amplitude of the reproduced signal is minimum), a gain control voltage is generated in such a manner that the signal amplitude outputted by a variable-gain amplifier attains a prescribed value which is one to two times the clamp level, thereby controlling the gain of the variable-gain amplifier. As a result, even if the amplitude of the reproduced signal is small, the difference between peak level and bottom level of the reproduced signal is clamped at a prescribed level with assurance and the center level thereof can be held constant, thus making accurate demodulation of data possible.

Further, according to the present invention, when a data pattern is constant, i.e., when data that has been recorded in a PLL draw-in area of a data field is reproduced, gain control is performed in such a manner that the signal amplitude outputted by the variable-gain amplifier becomes a constant value (the reference voltage value) which is one to two times the clamp level, thereby controlling the gain of the variable-gain amplifier. As a result, accurate gain control can be carried out and the difference between the peak level and bottom level of the reproduced signal is clamped at the prescribed level so that the center level thereof can be held constant.

Further, according to the invention, if a reference voltage is generated using a diode whose characteristics are identical with those of the diodes constructing the clamping circuit and these diodes are thermally coupled, and if this reference voltage is then applied to the gain control circuit, the amplitude of the signal outputted by the variable-gain amplifier can be held at a constant value which is one to two times the clamp level.

Furthermore, by adding on an arrangement in which the reproduced signal is differentiated, a zero-cross signal is outputted when the differentiated signal crosses the zero level and the zero-cross signal is used to output a mark signal in which the mark center is taken as being "1", data in which the mark edge is taken as being "1" and data in which the mark center is taken as being "1" can be modulated.

Further, in accordance with the invention, it is so arranged that amplitudes of differentiated signals obtained by differentiating a reference voltage and a reproduced signal are compared and the gain of the variable-gain amplifier is controlled based upon the results of the comparison. AS a result, gain can be controlled accurately without the influence of transient components.

Furthermore, since the gate signal is generated upon clamping peak and bottom, the gate signal can be generated accurately even if the peak and bottom values fluctuate. In addition, even in a case where resolution declines owing to an increase in density or a change in recording conditions, or even if there is a transient or envelope fluctuation, data can be reproduced accurately.

As many apparently widely different embodiments of the present invention can be made without departing from the spirit and scope thereof, it is to be understood that the invention is not limited to the specific embodiments thereof except as defined in the appended claims.

What is claimed is:

1. An optical disk apparatus having a zero-cross signal generating unit for differentiating a reproduced signal read from an optical disk and outputting a zero-cross signal when the differentiated signal crosses the zero level, and a gate signal generating unit for generating a gate signal using the reproduced signal, wherein a data pulse is outputted when the zero-cross signal is generated while the gate signal is being generated, said apparatus comprising:

a variable-gain amplifier for amplifying the reproduced signal;

a clamping circuit for clamping a peak value of an output signal from said variable-gain amplifier;

a reference voltage generator for generating a reference-voltage level;

an amplitude comparator for comparing amplitude of the clamped signal outputted by said clamping circuit with the reference-voltage level; and an AGC control unit for controlling gain of said variable-gain amplifier based upon results of comparison and controlling amplitude of the output signal from said clamping circuit;

wherein said gate signal generating unit generating the gate signal upon comparing the clamped signal outputted by said clamping circuit with a prescribed signal level.

2. The apparatus according to claim 1, wherein said clamping circuit is a diode clamping mechanism which includes:

a capacitor for cutting DC components of the reproduced signal;

a biasing resistor; and a diode forwardly biased via said biasing resistor and having an anode side connected to said capacitor.

3. The apparatus according to claim 2, wherein a time constant, which is decided by the capacitor for cutting DC components and the biasing resistor of said diode clamping mechanism, is greater than a longest interval among intervals from one peak point of an input signal to the next peak point of said input signal and is less than a VFO pattern length at the head of a data field.

4. The apparatus according to claim 2, wherein said diode is a Schottky barrier diode.

5. The apparatus according to claim 4, wherein the reference voltage level is decided in proportion to a forward-voltage drop of the diode.

6. The apparatus according to claim 5, wherein the reference voltage level is 1.1–1.7 times the forward-voltage drop of the diode.

7. The apparatus according to claim 1, wherein said amplitude comparator includes:
- a comparator element for comparing the reference level and the amplitude of the clamped signal; and
- a charge pump for sucking and expelling charge depending upon an output from said comparator element; and
- said AGC control unit has a low-pass filter for converting a current output from said charge pump to a voltage, an output from said low-pass filter serving as an AGC control voltage signal.

8. An optical disk apparatus for reproducing data of an optical disk by detecting mark edge, comprising:
- a clamping circuit for clamping a difference between peak level and bottom level of a reproduced signal at a prescribed value;
- a comparator circuit for discriminating a mark using center level of a clamped signal amplitude as a reference; and
- a demodulator for demodulating the data on the basis of a pulse signal which conforms to the mark outputted by said comparator circuit.

9. The apparatus according to claim 8, wherein said clamping circuit includes:
- first and second capacitors to one of which the reproduced signal is applied as an input and to the other of which a signal obtained by inverting the polarity of said reproduced signal is applied as an input;
- a diode pair in which the diodes are connected in opposite relation to each other; and
- a biasing circuit for biasing said diode pair;
- said first capacitor being connected to one end of said diode pair and said second capacitor being connected to the other end of said diode pair, and both ends of said diode pair being connected to a non-inverting terminal and an inverting terminal of a comparator constructing said comparator circuit.

10. The apparatus according to claim 9, wherein said diodes are Schottky barrier diodes.

11. The apparatus according to claim 8, further comprising:
- a variable-gain amplifier for amplifying the reproduced signal and inputting the amplified signal to said clamping circuit; and
- a gain control circuit for controlling gain of said variable-gain amplifier by generating a gain control voltage in such a manner that signal amplitude outputted by said variable-gain amplifier attains a prescribed value which is one to two times a clamp level when the reproduced signal attains a maximum frequency.

12. The apparatus according to claim 11, wherein said gain control circuit performs said gain control to control the gain of said variable-gain amplifier and holds the gain control voltage when data that has been recorded in a PLL draw-in area in a data field of the optical disk is reproduced, and controls the gain of said variable-gain amplifier to hold the gain fixed by the held gain control voltage when data that has been recorded in a user area of the data field is reproduced.

13. The apparatus according to claim 11, further comprising a reference voltage generating circuit for generating a reference voltage which is one to two times the clamp level;

said reference voltage generating circuit generating the reference voltage using a diode whose characteristics are identical with those of the diodes constructing said clamping circuit and which is thermally coupled with these diodes, and inputting the reference voltage to said gain control circuit.

14. The apparatus according to claim 13, further comprising an amplitude comparator for comparing the reference voltage with the signal amplitude outputted by said variable-gain amplifier;

said gain control circuit controlling the gain of said variable-gain amplifier based upon results of the amplitude comparison.

15. An optical disk apparatus for reading marks from an optical disk on which data is recorded by absence or presence of marks, and demodulating data from a reproduced signal obtained by reading the marks, comprising:
- discriminating means for discriminating whether a reproduction method used by the optical disk is a first reproduction method of performing reproduction by detecting edge of a mark or a second reproduction method of performing reproduction by detecting center of a mark;
- a clamping circuit for clamping a difference between a peak level and a bottom level of the reproduced signal at a prescribed value;
- a comparator circuit for discriminating marks using center level of a clamped signal amplitude as a reference, and outputting a pulse signal (first mark signal) conforming to a mark and a pulse signal (space signal) conforming to a space;
- a zero-cross signal generating unit for differentiating the reproduced signal and outputting a zero-cross signal when the differentiated signal crosses the zero level;
- means for outputting a data pulse sisal when the zero-cross signal is generated while the first mark signal is being generated; and
- a demodulator to which the first mark signal and the space signal are inputted, when the first reproduction method has been discriminated, for reproducing a clock signal from these signals and detecting the edge of a mark, and to which the data pulse signal is inputted, when the second reproduction method has been discriminated, for generating a clock signal from this signal and detecting the center of a mark, said demodulator demodulating data using said clock signal.

16. The apparatus according to claim 15, further comprising:
- a variable-gain amplifier for amplifying the reproduced signal and inputting the amplified signal to said clamping circuit;
- a reference voltage generating circuit for generating a reference voltage which is one to two times a clamp level;
- an amplitude comparator for comparing the reference voltage with signal amplitude of the differentiated signal; and
- a gain control circuit which, on the basis of results of comparison performed by said amplitude comparator, is for controlling gain of said variable-gain amplifier by generating a gain control voltage in such a manner that signal amplitude outputted by said variable-gain amplifier attains a prescribed value which is one to two times the clamp level.

17. An optical disk apparatus for demodulating data from a reproduced signal obtained by reading marks from an optical disk on which data is recorded by absence or presence of marks, comprising:

a clamping circuit for clamping a difference between a peak level and a bottom level of the reproduced signal at a prescribed value;

a variable-gain amplifier for amplifying the reproduced signal and inputting the amplified signal to the clamping circuit;

a comparator circuit for discriminating marks using center level of a clamped signal amplitude as a reference and outputting a pulse signal (gate signal) conforming to a mark;

a zero-cross signal generating unit for differentiating the reproduced signal and outputting a zero-cross signal when the differentiated signal crosses the zero level;

data-pulse output means for outputting a data pulse when the zero-cross signal is generated while the gate signal is being generated;

a demodulator for demodulating data from the data pulse;

a reference voltage generating circuit for generating a reference voltage which is one to two times a clamp level;

an amplitude comparator for comparing the reference voltage with the signal amplitude of the differentiated signal; and a gain control circuit which, on the basis of results of comparison performed by said amplitude comparator, is for controlling gain of said variable-gain amplifier by generating a gain control voltage in such a manner that signal amplitude outputted by said variable-gain amplifier attains a prescribed value which is one to two times the clamp level.

* * * * *

UNITED STATES PATENT AND TRADEMARK OFFICE
CERTIFICATE OF CORRECTION

PATENT NO. : 5,631,891
DATED : May 20, 1997
INVENTOR(S) : Moritsugu et al.

It is certified that error appears in the above-indentified patent and that said Letters Patent is hereby corrected as shown below:

Column 3, line 64, delete "an command" and insert --a command-- therefor.

Column 6, lines 30-31, delete "accumulates" and insert --accumulated-- therefor.

Column 7, line 16, delete "as vout." and insert --as Vout.--therefor.

Column 8, line 17, delete "state an then" and insert --state and then-- therefor.

UNITED STATES PATENT AND TRADEMARK OFFICE
CERTIFICATE OF CORRECTION

PATENT NO. : 5,631,891
DATED : May 20, 1997
INVENTOR(S) : Moritsugu et al.

It is certified that error appears in the above-indentified patent and that said Letters Patent is hereby corrected as shown below:

Column 10, line 26, delete "are is a diagram"

and insert --are diagrams-- therefor.

Column 10, line 28, delete "are diagram"

and insert --are diagrams-- therefor.

Column 13, line 32, delete "ST." and insert --8T.-- therefor.

Column 14, line 20, delete "drop V of" and insert --drop $V_F$ of-- therefor.

Column 15, line 7, delete "In, Iout." and insert --Iin, Iout.-- therefor.

UNITED STATES PATENT AND TRADEMARK OFFICE
CERTIFICATE OF CORRECTION

PATENT NO. : 5,631,891
DATED : May 20, 1997
INVENTOR(S) : Moritsugu et al.

It is certified that error appears in the above-indentified patent and that said Letters Patent is hereby corrected as shown below:

Column 15, line 61, delete "VcntO" and insert --Vcnt)-- therefor.

Column 16, line 25, delete "amplitude)/VF)]" and insert --amplitude)/$V_F$]-- therefor.

Column 20, line 29, delete "outputted" and insert --outputted.-- therefor.

Column 23, line 23, delete "a contact of" and insert --a contact or-- therefor.

Column 26, line 9, delete "AS a" and insert --As a-- therefor.

UNITED STATES PATENT AND TRADEMARK OFFICE
CERTIFICATE OF CORRECTION

PATENT NO. : 5,631,891
DATED : May 20, 1997
INVENTOR(S) : Moritsugu et al.

It is certified that error appears in the above-indentified patent and that said Letters Patent is hereby corrected as shown below:

Column 28, line 35, delete "sisal" and insert

--signal-- therefor.

Signed and Sealed this

Eleventh Day of August 1998

Attest:

BRUCE LEHMAN

*Attesting Officer*  *Commissioner of Patents and Trademarks*